(12) United States Patent
Thomas et al.

(10) Patent No.: US 11,971,596 B2
(45) Date of Patent: Apr. 30, 2024

(54) HYBRID ENCLOSURES FOR POWER AND OPTICAL FIBER, AND ENCLOSURES INCLUDING MULTIPLE PROTECTIVE LIDS

(71) Applicant: CommScope Technologies LLC, Hickory, NC (US)

(72) Inventors: David Thomas, Chester (GB); David T. Lambert, Manchester (GB); David Palfreyman, Rochdale (GB); Joshua Simer, Chaska, MN (US); Thomas F. Craft, Jr., Murphy, TX (US); Rudy Musschebroeck, Wemmel (BE); Andrew Williams, Llandudno (GB); Willis F. James, Wylie, TX (US)

(73) Assignee: CommScope Technologies LLC, Hickory, NC (US)

( * ) Notice: Subject to any disclaimer, the term of this patent is extended or adjusted under 35 U.S.C. 154(b) by 536 days.

(21) Appl. No.: 17/270,710

(22) PCT Filed: Jul. 19, 2019

(86) PCT No.: PCT/US2019/042566
§ 371 (c)(1),
(2) Date: Feb. 23, 2021

(87) PCT Pub. No.: WO2020/040913
PCT Pub. Date: Feb. 27, 2020

(65) Prior Publication Data
US 2021/0239930 A1 Aug. 5, 2021

Related U.S. Application Data

(60) Provisional application No. 62/812,475, filed on Mar. 1, 2019, provisional application No. 62/722,416, filed on Aug. 24, 2018.

(51) Int. Cl.
G02B 6/44 (2006.01)
H02G 3/08 (2006.01)
H02G 3/16 (2006.01)

(52) U.S. Cl.
CPC ......... *G02B 6/4448* (2013.01); *G02B 6/4442* (2013.01); *H02G 3/081* (2013.01); *H02G 3/16* (2013.01)

(58) Field of Classification Search
None
See application file for complete search history.

(56) References Cited

U.S. PATENT DOCUMENTS 9,535,226 B2 * 1/2017 Simmons ............. G02B 6/4453
9,557,505 B2 1/2017 Huegerich et al.
(Continued)

FOREIGN PATENT DOCUMENTS

DE 1002436 B 2/1957
EP 0517619 A1 12/1992
(Continued)

OTHER PUBLICATIONS

"Terminal Enclosures—Enclosure with Terminal Block—Lite Cycle" Retrieved from URL: http://web.archive.org/web/20180821031930/https://www.litecycle.com/collections/terminal-enclosures (Aug. 21, 2018).

(Continued)

*Primary Examiner* — Jerry Rahll
(74) *Attorney, Agent, or Firm* — Myers Bigel, P.A.

(57) ABSTRACT

Hybrid enclosures for power and optical fiber are provided herein. A hybrid enclosure includes a power conductor terminal and an optical fiber splice area that are in separate first and second trays, respectively. In some embodiments, the power conductor terminal is a terminal of a circuit that is configured to supply power exceeding 150 Watts. Enclo- (Continued)

sures including multiple protective lids over power conductor terminal blocks are also provided.

20 Claims, 19 Drawing Sheets

(56) References Cited

U.S. PATENT DOCUMENTS

| | | | |
|---|---|---|---|
| 9,893,811 B2 | 2/2018 | Chappell et al. | |
| 9,977,208 B2 | 5/2018 | Huegerich et al. | |
| 11,592,638 B2* | 2/2023 | Craft, Jr. | G02B 6/4454 |
| 2003/0072062 A1* | 4/2003 | Pedersen | H04B 10/2916 |
| | | | 398/97 |
| 2006/0153362 A1* | 7/2006 | Bloodworth | H02G 3/08 |
| | | | 379/413.02 |
| 2006/0204393 A1* | 9/2006 | Sobel | H05K 5/02 |
| | | | 418/132 |
| 2007/0192817 A1* | 8/2007 | Landry | G02B 6/4457 |
| | | | 725/120 |
| 2012/0200979 A1* | 8/2012 | Miller | H02H 9/04 |
| | | | 361/119 |
| 2021/0373268 A1* | 12/2021 | Craft, Jr. | G02B 6/4441 |

FOREIGN PATENT DOCUMENTS

| | | |
|---|---|---|
| EP | 2418525 A1 | 2/2012 |
| EP | 3327732 A1 | 5/2018 |
| WO | 2013165657 A1 | 11/2013 |

OTHER PUBLICATIONS

International Search Report and the Written Opinion of the International Searching Authority in corresponding PCT Application No. PCT/US2019/042566 (19 pages) (dated Jan. 10, 2020).

* cited by examiner

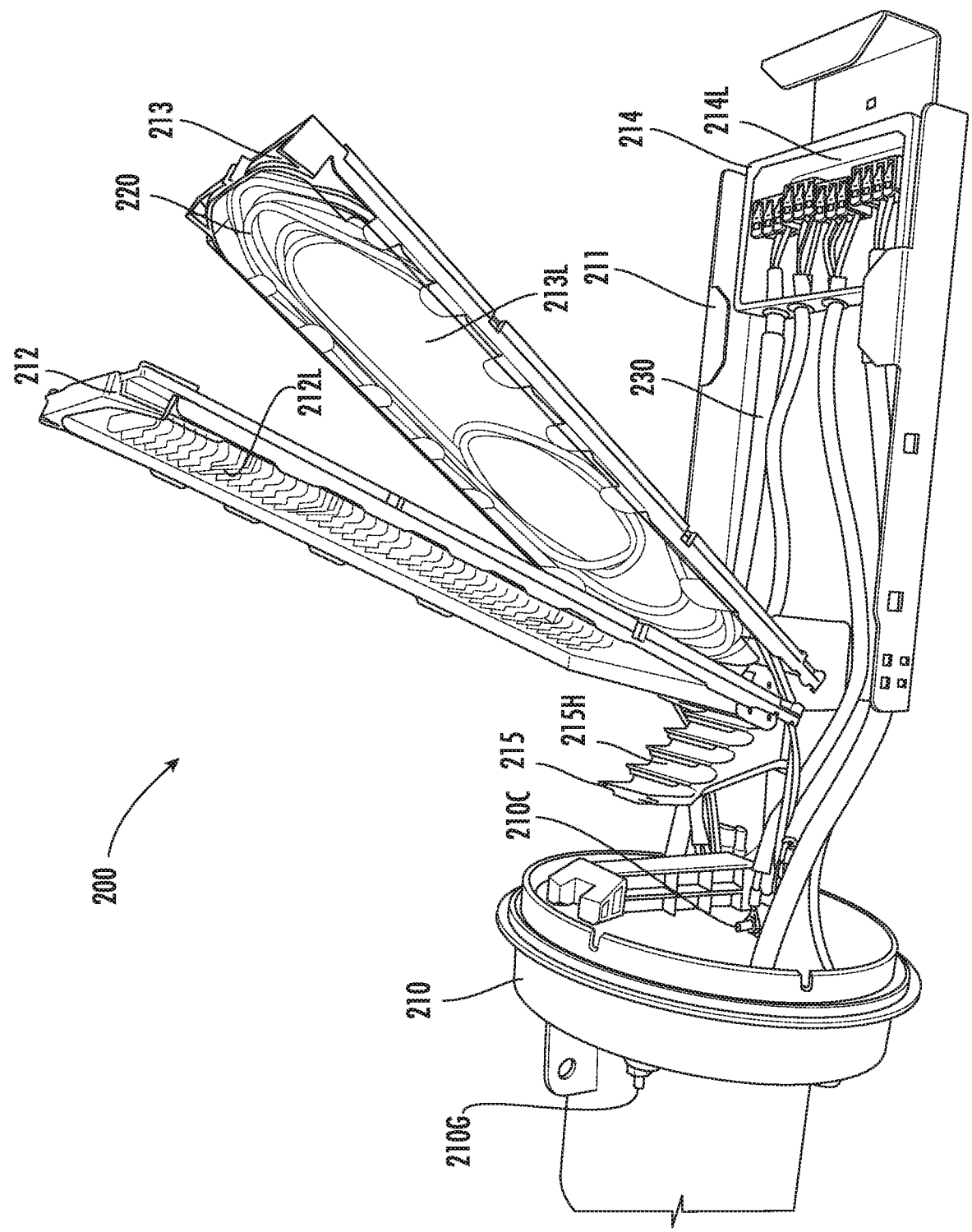

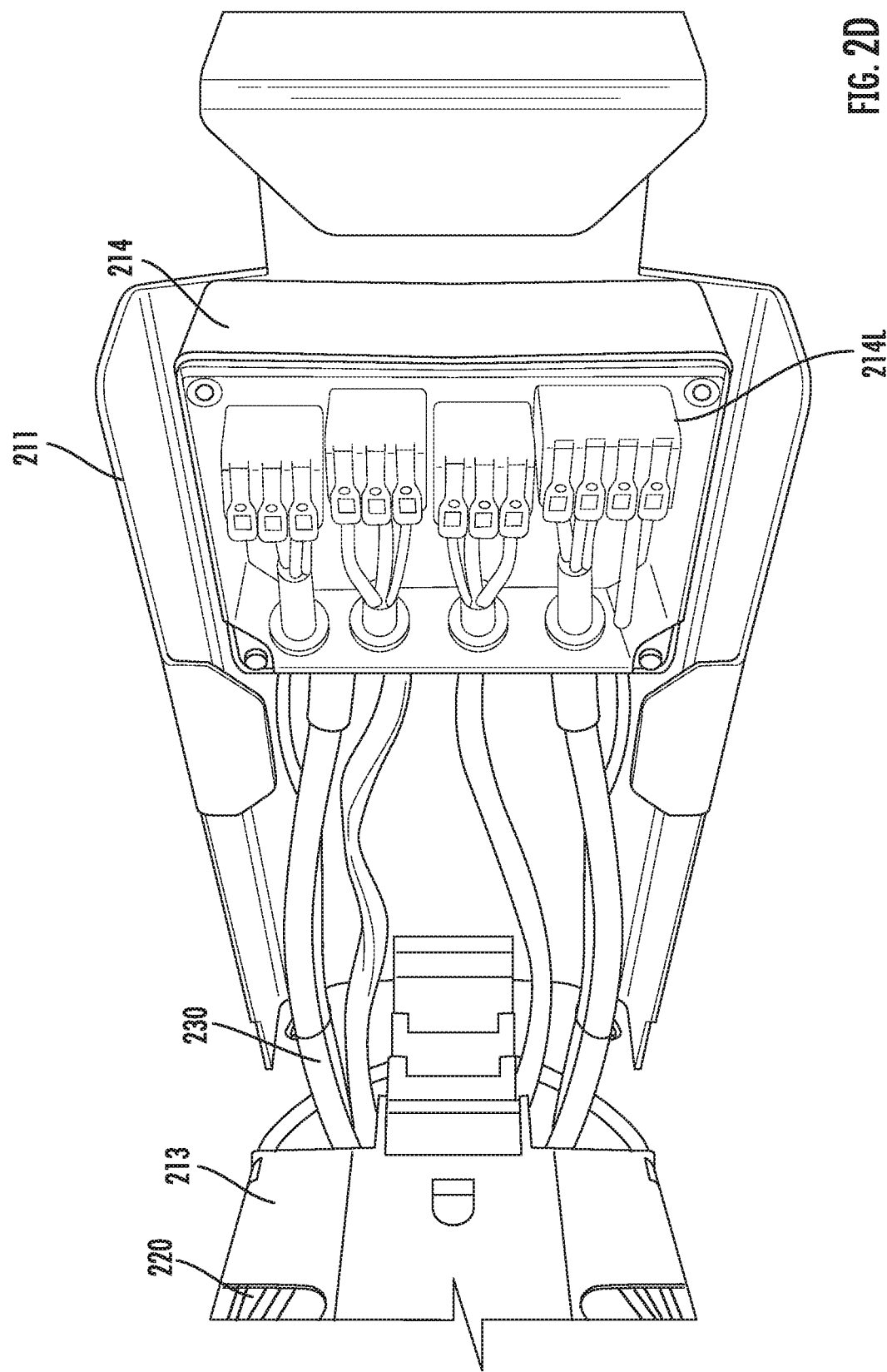

HYBRID ENCLOSURES FOR POWER AND OPTICAL FIBER, AND ENCLOSURES INCLUDING MULTIPLE PROTECTIVE LIDS

CROSS-REFERENCE TO RELATED APPLICATIONS

The present application is a 35 U.S.C. § 371 national stage application of PCT International Application No. PCT/US2019/042566, filed Jul. 19, 2019, which itself claims priority to U.S. Provisional Patent Application Nos. 62/722,416, filed Aug. 24, 2018, and 62/812,475, filed Mar. 1, 2019, the entire content of each of which is incorporated herein by reference.

FIELD

The present disclosure relates to communication systems and, in particular, to enclosures for optical fiber.

BACKGROUND

In many information and communication technology systems, network-connected electronic devices are deployed in locations where a local electric power source is not available. With the proliferation of the Internet of Things ("IoT"), autonomous driving, fifth generation ("5G") cellular service, and the like, it is anticipated that network-connected electronic devices will increasingly be deployed at locations that lack a conventional electric power source.

Electric power may be provided to such remote network-connected electronic devices in numerous ways. For example, a local electric utility company can install a connection to the electric power grid. This approach, however, is typically both expensive and time-consuming, and unsuitable for many applications. Composite power-data cables can also be used to power remote network-connected electronic devices and provide data connectivity thereto over a single cabling connection. Composite power-data cables refer to cables that can transmit both electrical power and data. Power-over Ethernet ("PoE") cables are one type of composite power-data cable. PoE technology, however, has limitations in terms of both data communication throughput and the amount of power delivered, and these limitations become more restrictive with increased distance between the remote network-connected electronic device and the PoE source. For example, under current PoE standards, high throughput data communications may only be supported for cable lengths of up to about 100 meters, and even at these short distances the power delivery capacity is only about 100 Watts. Power-plus-fiber cables are another example of a type of composite power-data cable that includes both power conductors and optical fibers within a common cable jacket. Power-plus-fiber cables, however, can be prohibitively expensive to install for many applications. Other known types of composite power-data cables include coaxial cables, telephone twisted pair cables with remote power feeding on some pairs and direct subscriber line (DSL) data on other pairs or with both power and DSL on the same pairs, and composite cables having larger conductors (e.g., 10-12 AWG) for power transmission and smaller gauge twisted pairs for data transmission.

SUMMARY

A power and fiber splice enclosure, according to some embodiments herein, may include a first tray that includes a power conductor terminal. The power and fiber splice enclosure may include a second tray that includes an optical fiber splice area. The power and fiber splice enclosure may include a third tray that includes an optical fiber storage tray. Moreover, the power and fiber splice enclosure may include a protective lid over the power conductor terminal that is in the first tray.

In some embodiments, the first tray may further include a power-in port, a power-out port, and first and second power tap ports. Moreover, the power conductor terminal may be a terminal of one of the power-in port, the power-out port, the first power tap port, or the second power tap port. The power and fiber splice enclosure may, in some embodiments, further include first, second, third, and fourth circuit breakers that include, or are coupled to, the power-in port, the power-out port, the first power tap port, and the second power tap port, respectively. Additionally or alternatively, the power and fiber splice enclosure (e.g., the first tray thereof) may include a third power tap port and/or a second power-out port.

According to some embodiments, the power and fiber splice enclosure may include a compartment that includes the power conductor terminal in the first tray, and the protective lid may be a transparent lid that is on the compartment. The compartment and the first tray may, in some embodiments, be respective fiber-free trays, and the second and third trays may be respective power-free trays.

In some embodiments, the power conductor terminal may be a terminal of a circuit that is configured to supply power exceeding 150 Watts. Additionally or alternatively, the power and fiber splice enclosure may further include a tray attachment structure, and the second and third trays may be hingedly coupled to the tray attachment structure.

According to some embodiments, the optical fiber storage tray may have storage capacity for at least two meters of length of one or more fiber optic tubes. Additionally or alternatively, a base portion of the power and fiber splice enclosure may have a metal ground terminal thereon.

In some embodiments, the optical fiber splice area may include a splice module that is in the second tray. The splice module may, in some embodiments, be one among a plurality of splice modules in the second tray.

According to some embodiments, the power and fiber splice enclosure may further include a DIN rail mount circuit breaker that is in the first tray, and the power conductor terminal that is in the first tray may be a terminal of the DIN rail mount circuit breaker. Additionally or alternatively, the power and fiber splice enclosure may further include surge-protection circuitry that is in the first tray. For example, the surge-protection circuitry may include a DIN rail mount surge protector that is in the first tray.

In some embodiments, the power and fiber splice enclosure may further include a visual power-on warning indicator that is configured to indicate that the power conductor terminal is energized, and/or a locking mechanism that is configured to automatically lock the protective lid in response to the power conductor terminal being energized. Additionally or alternatively, the power and fiber splice enclosure may further include a fiber optic tube that is in the optical fiber storage tray, an optical fiber that is connected to the optical fiber splice area in the second tray, and a power conductor that is configured to supply power exceeding 150 Watts and is connected to the power conductor terminal.

According to some embodiments, the protective lid may be a first protective lid, and the power conductor terminal may be a terminal of a first power conductor terminal block in the first tray. Moreover, the power and fiber splice enclosure may include: a second power conductor terminal block in the first tray; and a second protective lid over the second power conductor terminal block.

In some embodiments, the first and second protective lids may be first and second slidable lids, respectively. Additionally or alternatively, the first protective lid may be over the second protective lid and the second power conductor terminal block, and the power and fiber splice enclosure may include a third protective lid that is over the first power conductor terminal block and under the first protective lid. Moreover, the first slidable lid may overlap a portion of the second slidable lid.

According to some embodiments, the power and fiber splice enclosure may include a safety element configured to cut off power in the power and fiber splice enclosure in response to detecting movement of the second protective lid. For example, the safety element may include a switch in the first tray.

In some embodiments, the power and fiber splice enclosure may include a power plug on an external surface of the first tray. Additionally or alternatively, the power and fiber splice enclosure may include a power connector on an outside of the power and fiber splice enclosure.

A power and fiber splice enclosure, according to some embodiments herein, may include a first tray that includes a power-in port, a power-out port, and a power tap port. The power and fiber splice enclosure may include a second tray that includes an optical fiber splice area. The power and fiber splice enclosure may include a third tray that includes an optical fiber storage tray. The power and fiber splice enclosure may include a protective lid that is on the first tray and is over the power-in port, the power-out port, and the power tap port. Moreover, the power and fiber splice enclosure may include a fourth tray that includes the first tray therein.

In some embodiments, the first and fourth trays may be respective fiber-free trays, the second and third trays may be respective power-free trays, the power tap port may be a first power tap port, the power and fiber splice enclosure may further include a second power tap port that is in the first tray and is under the protective lid, and the power-in port, the power-out port, and the first and second power tap ports may be ports of a circuit that is configured to supply power exceeding 150 Watts.

A hybrid enclosure, according to some embodiments herein, may include a power conductor terminal and an optical fiber splice area that are in separate first and second trays, respectively. The power conductor terminal may be a terminal of a circuit that is configured to supply power exceeding 150 Watts. In some embodiments, the hybrid enclosure may further include at least one power-in/out port and at least one power tap port in the first tray. Moreover, the power conductor terminal may be a terminal of one of the at least one power-in/out port or the at least one power tap port, the first tray may be a fiber-free tray, and the second tray may be a power-free tray.

A cable enclosure, according to some embodiments herein, may include a tray including first and second power conductor terminal blocks. The cable enclosure may include a first protective lid over the first power conductor terminal block. Moreover, the cable enclosure may include a second protective lid over the second power conductor terminal block.

In some embodiments, the first and second protective lids may be first and second slidable lids, respectively. Additionally or alternatively, the second protective lid may be between the first protective lid and the second power conductor terminal block, and the cable enclosure may include a third protective lid between the first protective lid and the first power conductor terminal block. Moreover, the first slidable lid may overlap a portion of the second slidable lid.

According to some embodiments, the cable enclosure may include a safety element configured to cut off power in the cable enclosure in response to detecting movement of the second protective lid. For example, the safety element may include a switch in the tray.

In some embodiments, the cable enclosure may include a structural divider between the first and second power conductor terminal blocks. Additionally or alternatively, the tray may be a first tray, the cable enclosure may include second and third trays in the first tray, and the first and second power conductor terminal blocks may be in the second and third trays, respectively.

According to some embodiments, the cable enclosure may be a fiber-free enclosure. Additionally or alternatively, the cable enclosure may include first and second power cables, and first and second positive conductors of the first and second power cables, respectively, may be electrically connected to the first power conductor terminal block. Moreover, first and second negative conductors of the first and second power cables, respectively, may be electrically connected to the second power conductor terminal block.

BRIEF DESCRIPTION OF THE DRAWINGS

FIGS. 2A-2E are views of trays of a power and fiber splice enclosure according to embodiments of the present inventive concepts.

DETAILED DESCRIPTION

Figure 1:
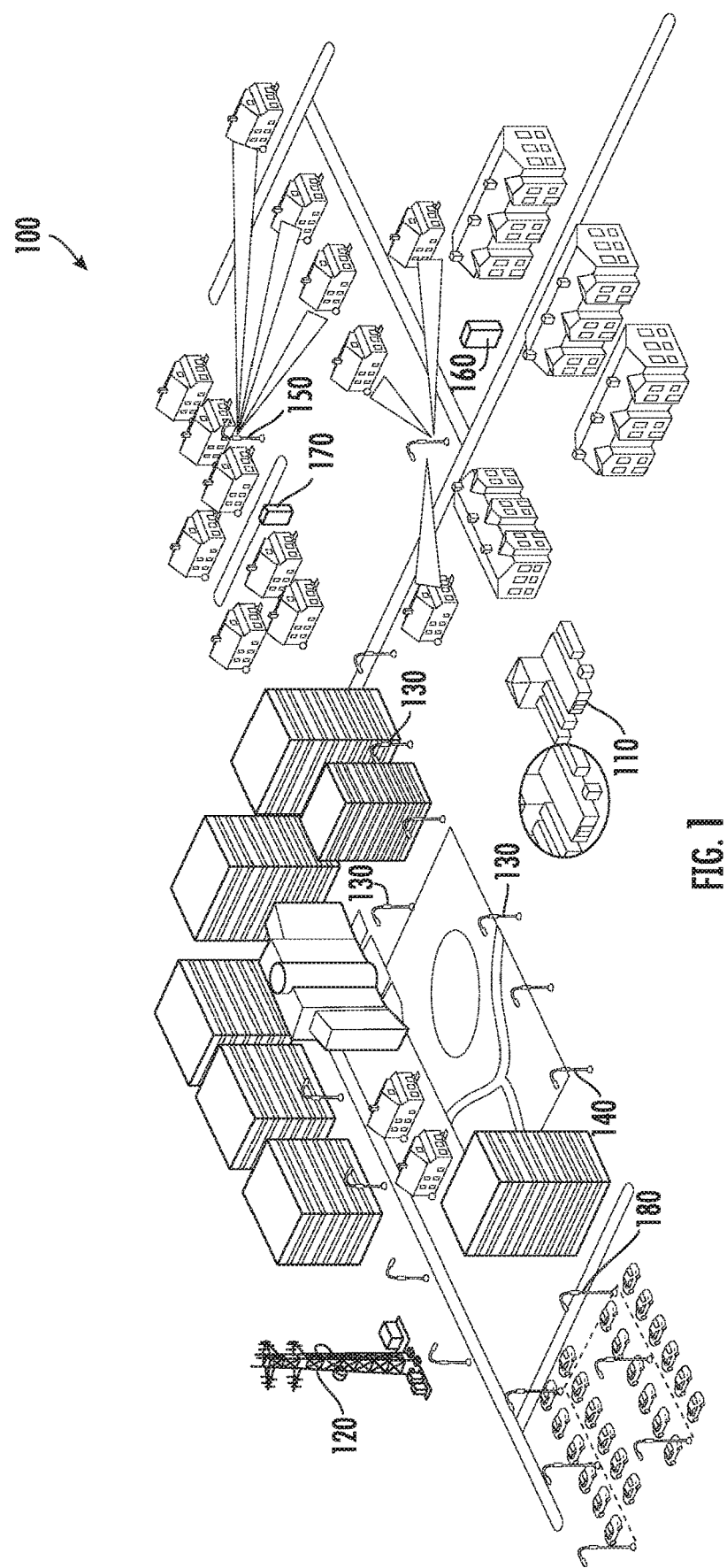
FIG. 1 is a schematic diagram illustrating the increasing power and data connectivity needs for information and communication technology infrastructure in high density access networks.

Pursuant to embodiments of the present inventive concepts, enclosures for power cables and fiber optic data tubes are provided for data/power grids. For example, it may be desirable to provide in-line distribution of both power cables, such as copper power cables, and fiber optic data tubes in an outside plant environment, to improve distributed power connectivity. The power cables and fiber optic data tubes can be separate cables or a hybrid (i.e., combined/composite) cable. The purpose of an enclosure for both power cables and fiber optic data tubes is to enable one or more tap offs (e.g., drops) for power connections and also one or more tap offs for fiber data connections for communications devices, such as cellular radios. Such an enclosure may be referred to herein as a "power and fiber enclosure," a "dual enclosure," a "composite enclosure," and/or a "hybrid enclosure." In embodiments in which the enclosure includes a fiber splice area, the enclosure may be referred to herein as a "power and fiber splice enclosure" or a "fiber optic splice closure." In some embodiments, the enclosure may also allow a main feed cable to continue to the next location having a tap off, where another enclosure can be installed. Moreover, the terms "closure" and "enclosure" may be used interchangeably herein.

According to embodiments of the present inventive concepts, an enclosure may comprise a tray for power conductor termination and tap off. For example, the tray may be a re-purposed (e.g., modified) cable tray/basket. The electrical connections in the tray may be behind a cover (e.g., a lid), which may enhance safety for a technician, who may access the enclosure to make a fiber connection but may not be trained for power connections. In some embodiments, another tray, which may be a fiber splice tray, may be re-purposed to provide fiber optic tube slack (e.g., excess tube) storage. The depth of such a tray can vary based on how much slack storage is desired. The use of the different trays can provide demarcation between power and fiber, thus enhancing safety. Additional enhancements may, in some embodiments, include (a) using circuit breakers (e.g., miniature circuit breakers) to allow local power down/protection of equipment, (b) surge protection circuitry, and/or (c) a visual indicator (e.g., a warning light) that power is on. For example, having a circuit breaker at each power tap port can facilitate turning off power at an individual power tap port, thus allowing the technician to perform maintenance with respect to the individual power tap port. As used herein, the terms "power tap port" and "power tap off" may be used interchangeably.

Cellular data traffic has increased by about 4,000 percent over the last decade, and is expected to continue increasing at a rate of over 50% per year for at least the next several years. Cellular operators are beginning to deploy 5G cellular networks in an effort to support the increased cellular data traffic with better coverage and reduced latency. One expected change in the cellular architecture that is anticipated with the deployment of 5G networks is a rapid increase in the number of so-called small cell base stations that are deployed. Generally speaking, a "small cell" base station refers to an operator-controlled, low-power radio access node that operates in the licensed spectrum and/or that operates in the unlicensed spectrum. The term "small cell" encompasses microcells, picocells, femtocells, and metrocells that support communications with fixed and mobile subscribers that are within, for example, between about 10 meters and 300-500 meters of the small cell base station, depending on the type of small cell used. The term small cell generally does not encompass in-building solutions such as distributed antenna systems that are typically implemented as part of the macrocell layer of a cellular network.

Small cell base stations are typically deployed within the coverage area of a base station of the macrocell network, and the small cell base stations are used to provide increased throughput in high traffic areas within the macrocell. This approach allows the macrocell base station to be used to provide coverage over a wide area, with the small cell base stations supporting much of the capacity requirements in high traffic areas within the macrocell. In heavily-populated urban and suburban areas, it is anticipated that more than ten small cells will be deployed within a typical 5G macrocell to support the increased throughput requirements. As small cell base stations have limited range, they must be located in close proximity to users, which typically requires that the small cell base stations be located outdoors, often on publicly-owned land, such as along streets. Typical outdoor locations for small cell base stations include lamp posts, utility poles, street signs, and the like, which are locations that either do not include an electric power source, or include a power source that is owned and operated by an entity other than the cellular network operator. A typical small cell base station may require between 200-1,000 Watts of power. As small cell base stations are deployed in large numbers, providing electric power to the small cell base station locations represents a significant challenge.

When deploying a new macrocell base station, a cellular operator will typically work with the local electric utility company to arrange to have alternating current ("AC") power provided to the site from the local electric power grid. Although this process may be both time-consuming and expensive, the time required to plan, build, and deploy a new macrocell base station may be as long as two years, allowing sufficient time for coordinating with the electric utility company, obtaining necessary permitting from local government agencies, and then having the local electric utility company deploy the connection to the electric power grid to deliver power to the site. Moreover, the cost associated with providing power to the macrocell base station, which may be on the order of $5,000 to $20,000, can readily be absorbed by a macrocell base station that serves thousands of users. Thus, providing electric power to macrocell base stations has not raised major issues for cellular network operators. Unfortunately, however, the model for delivering electric power to macrocell base stations does not work well with small cell deployments, where the cellular network operator typically needs to deploy small cell base stations quickly and in a cost-effective manner. To meet these goals, cellular operators can benefit from a repeatable process for delivering electric power to small cell base station locations that preferably does not require involvement of third parties such as electric utility companies.

One solution that has been proposed for powering small cell base stations is the use of composite power-data cables. Composite power-data cables allow a cellular network operator to deploy a single cable between a hub and a small cell base station that provides both electric power and backhaul connectivity to the small cell base station. The hub may be, for example, a central office, a macrocell base station, or some other network operator owned site that is connected to the electric power grid. All cellular base stations must have some sort of backhaul connection to the core network, and with small cell base stations the backhaul connection is typically implemented as a fiber optic cabling connection. Because the cellular network operator already would typically deploy a fiber optic cable to a new small cell base station installation, changing the fiber optic cable to a power-plus-fiber cable provides a relatively low cost solution for also providing an electric power connection to the new small cell base station, particularly as the installation costs associated with installing a new cabling connection between a hub and the new small cell base station will typically exceed, and often far exceed, the additional cost associated with adding power conductors to the fiber optic cable. For example, the incremental cost of deploying (installing) a power-plus-fiber cable as compared to deploying a fiber optic cable may be less than $1/foot, whereas the cost of deploying cables in the outside plant environment may be on the order of $1.5/foot to $6/foot in typical installations. Moreover, in urban areas—which are some of the most common locations where new small cell base stations are being deployed—the cables often must be installed underground beneath concrete or asphalt surfaces. In such environments, the installation costs can be as high as $30-40/foot or even more.

Although using composite power-data cables may be an improvement over more conventional solutions for powering small cell base stations and other remote network-connected devices, deploying long composite power-data cables can be expensive and time-consuming, and hence may not be a completely satisfactory solution. As such, new techniques for providing backhaul and power connectivity to 5G small cell base stations and other remote network-connected device may be beneficial.

According to U.S. Patent Application No. 62/700,350, the entire disclosure of which is hereby incorporated by reference herein, power and data connectivity micro grids may be provided for information and communication technology infrastructure, including small cell base stations. These power and data connectivity micro grids may be owned and controlled by cellular network operators, thus allowing the cellular network operators to more quickly and less expensively provide power and data connectivity (backhaul) to new small cell base stations. The power and data connectivity micro grids may be cost-effectively deployed by over-provisioning the power sourcing equipment and cables that are installed, to provide power and data connectivity to new installations, such as new small cell base station installations.

The power and data connectivity micro grids may include a network of composite power-data cables that are used to distribute electric power and data connectivity throughout a defined region. These micro grids may be deployed in high density areas, which is where most 5G small cell base stations will need to be deployed. Each micro grid may include a network of composite power-data cables that extend throughout a geographic area. The network of composite power-data cables (and the sourcing equipment supplying the network of composite power-data cables with power and data capacity) may be designed to have power and data capacity far exceeding the capacity requirements of existing nodes along the micro grid. Because such excess capacity is provided, when new remote network-connected devices are installed in the vicinity of a micro grid, composite power-data cables can be routed from tap points along the micro grid to the location of the new remote network-connected device (e.g., a new small cell base station). The newly installed composite power-data cables may themselves be over-provisioned and additional tap points may be provided along the new composite power-data cabling connections so that each new installation may act to further extend the footprint of the micro grid. In this fashion, cellular network operators may incrementally establish their own power and data connectivity micro grids throughout high density areas, which means that when new small cell base stations, WiFi access points, or other remote powered devices are deployed, they will often be in close proximity to at least one tap point along the micro grid. In many cases, the only additional cabling that will be required to power such new base stations is a relatively short composite power-data cable that connects the new small cell base station to an existing tap point of the micro grid. Moreover, by over-provisioning some or all of the newly-installed composite power-data cables, the micro grids may naturally grow throughout high density areas, thus allowing network operators to quickly and inexpensively add new infrastructure to their networks. The composite power-data cables may be implemented as, for example, power-plus-fiber cables, as such cables have significant power and data transmission capacity. Other composite power-data cables (e.g., coaxial cables), however, may additionally and/or alternatively be used.

The power delivery component of the power and data connectivity micro grids may comprise a low voltage, direct current ("DC") power grid. The DC power signals that are distributed over the micro grid may have a voltage that is higher than the (AC) voltages used in most electric utility power distribution systems (e.g., 110 V or 220 V AC), which may help reduce power loss, but the voltage may be lower than 1500 V DC so as to qualify as a low voltage DC voltage under current standards promulgated by the International Electrotechnical Commission (IEC). For example, the micro grid may carry a 380 V DC power signal (or some other DC voltage greater than 48-60 V and less than 1500 V). Tap points may be installed along the composite power-data cables. The tap points may comprise intelligent remote distribution nodes that include a gated pass-through power bus that allows for daisy chain operation and/or splitting of the power signal, as well as one or more local ports that may be used to power remote powered devices that are co-located with the intelligent remote distribution node or in close proximity thereto. When a new composite power-data cable is installed, one or more unused intelligent remote distribution nodes may be pre-installed along the composite power-data cable to serve as tap points for information and communication infrastructure that is deployed in the future. The tap points may comprise splice enclosures that are installed along the composite power-data cables. These splice enclosures may be similar to conventional fiber optic splice enclosures and may include terminations for both the optical fibers and power conductors of the composite power-data cables. The splice enclosures may provide connection points for "branch" composite power-data cables that supply power and data connectivity to existing installations that are connected to the micro grid, may include a gated pass-through power bus, and/or may act as tap points for future installations.

In some instances, multiple composite power-data cables may be deployed that run in parallel between power and data connectivity source equipment and splice enclosures and/or intelligent remote distribution nodes, to pre-install additional power and data capacity that can be tapped into later to support future installations. In this fashion, power and data connectivity may be deployed to new installations while at the same time building out a highly over-provisioned micro grid of power and data connectivity resources that may be used to economically provide power and data connectivity to future installations. Such an approach has the potential to significantly reduce the costs of providing power and data connectivity to newly deployed equipment while also significantly reducing the time required to provide such power and data to a new installation. Additional power sourcing equipment devices may be installed as the micro grid grows, and in some cases power and data may be fed to splice enclosures and/or intelligent remote distribution nodes from multiple power sourcing equipment devices.

This may increase the number of remote powered devices that may be supported by the micro grid and may provide redundancy in the event of a fault at one of the power sourcing equipment devices. Embodiments of the present inventive concepts provide enclosures that may be used in micro grids, including the micro grids that are described in U.S. Patent Application No. 62/700,350.

Example embodiments of the present inventive concepts will be described in greater detail with reference to the attached figures.

FIG. 1 is a schematic diagram illustrating the increasing power and data connectivity needs for information and communication technology infrastructure in high density access networks. As shown in FIG. 1, in an urban or suburban environment 100, a telecommunications provider, such as a cellular network operator, may operate a central office 110 and a macrocell base station 120. In addition, the telecommunications provider may operate a plurality of small cell base stations 130, WiFi access points 140, fixed wireless nodes 150, active cabinets 160, DSL (e.g., G.fast) distribution points 170, security cameras 180, and the like. All of these installations may require DC power to operate active equipment, and most, if not all, of these installations may also require data connectivity either for backhaul connections to the central office 110 and/or for control or monitoring purposes. It may be both expensive and time consuming to provide local power sources for these installations.

To reduce costs and increase the speed at which electric power and data connectivity can be deployed to remote network-connected powered devices such as the remote devices 130, 140, 150, 160, 170, 180 illustrated in FIG. 1, the use of power-plus-fiber cables has been proposed. For example, PCT Publication No. WO 2018/017544 A1, which is incorporated herein in its entirety by reference, discloses an approach for providing power and data connectivity to a series of remote powered devices in which power-plus-fiber cables extend from a power source to a plurality of intelligent remote distribution nodes. Each intelligent remote distribution node may include a "pass-through" port so that a plurality of remote distribution nodes may be coupled to the power source in "daisy chain" fashion. Intelligent remote powered devices may be connected to each intelligent remote distribution node and may receive power and data connectivity from the intelligent remote distribution node.

One drawback of the approach disclosed in PCT Publication No. WO 2018/017544 A1 is that as new installations are deployed, it is necessary to install another power-plus-fiber cable that runs from the power source to the new installation. Deploying such power-plus-fiber cables can be time consuming and expensive, particularly in urban environments.

According to U.S. Patent Application No. 62/700,350, the power source equipment and remote distribution node approach disclosed in PCT Publication No. WO 2018/017544 A1 may be extended so that cellular network operators may create a hard wired power and data connectivity micro grid throughout high density urban and suburban areas. As new installations (e.g., new small cell base stations 130, security cameras 180, and the like) are deployed in such areas, the cellular network operator may simply tap into a nearby portion of the micro grid to obtain power and data connectivity without any need to run cabling connections all the way from the power and data source equipment to the new installation. The micro grids may be viewed as being akin to the backplane on a computer, as the micro grids extend throughout the area in which power and data connectivity are required and have excess power and data connectivity resources available so that new installations may simply "plug into" the micro grid at any of a large number of tap points.

Figure 2B:
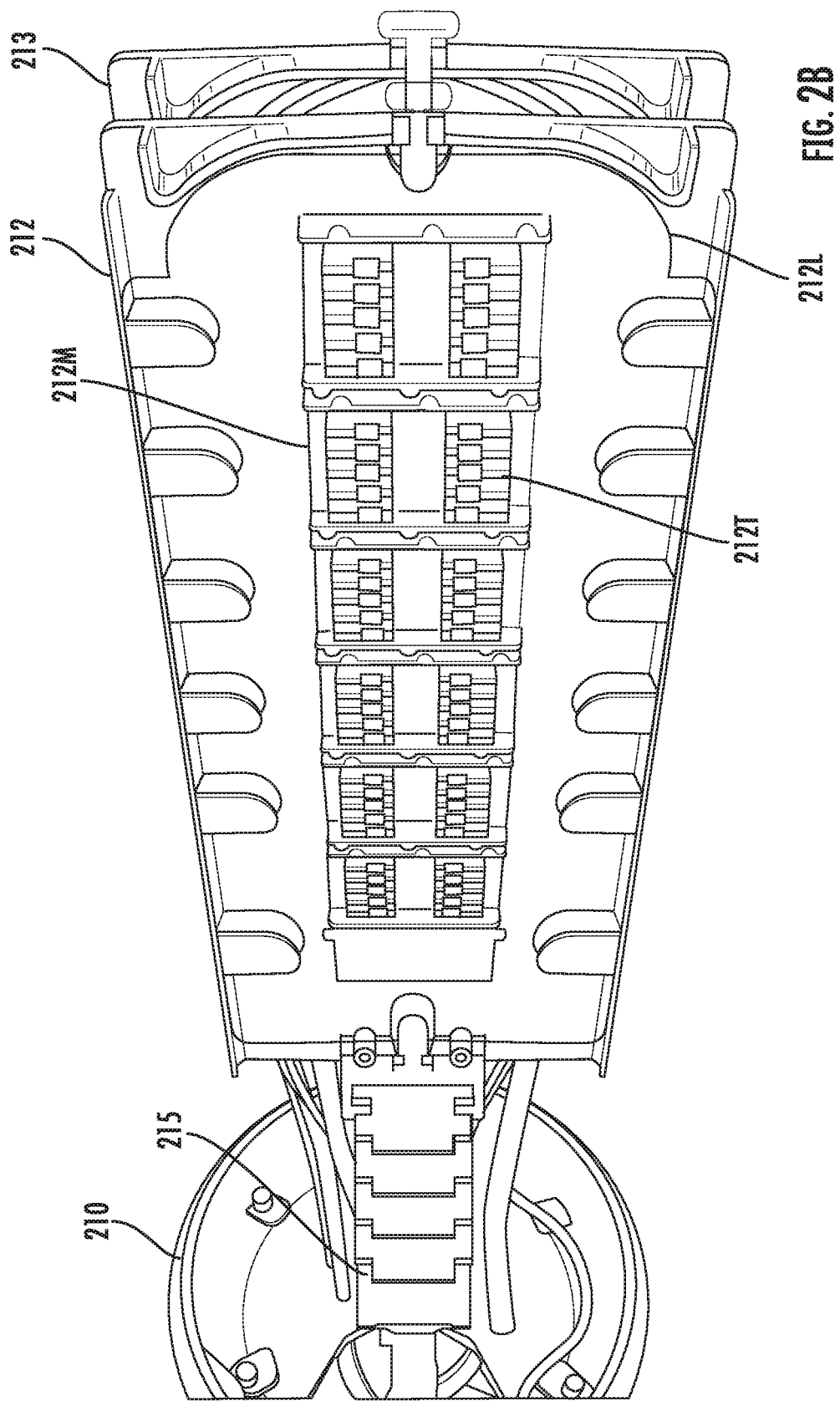

FIGS. 2A-2E are views of trays 211-214 of a power and fiber splice enclosure 200 according to embodiments of the present inventive concepts. FIG. 2A is a side perspective view of the trays 211-214 according to embodiments of the present inventive concepts. The trays 211-214 may be accessed by removing a portion of the enclosure 200. For example, the enclosure 200, which may also be referred to herein as a "closure," may include a polymer (e.g., plastic) base portion 210 and a polymer dome, or other structure, that can attach to the base portion 210 to enclose the trays 211-214. The enclosure 200 may thus protect the trays 211-214 from weather, wildlife, and other elements that should not contact the trays 211-214. In one example, the trays 211-214 may be accessed by removing the dome (e.g., the dome 210D of FIG. 5A) from the base portion 210. Lower ones of the trays 211-214 may then be accessed by hinging upper ones of the trays 211-214.

A ground terminal 210G may be on an exterior surface (and/or on an interior surface) of the base portion 210 and may provide a common ground point for the trays 211-214. For example, the ground terminal 210G may be a metal component, such as a screw or bolt, that is connected to outside earth. Moreover, an interior surface of the base portion 210 may have a further metal component 210C, which may provide a connection to the shield of a hybrid cable that is in the enclosure 200.

The trays 211-214 may be attached to an attachment structure 215, which can slide into and out of the enclosure 200. In some embodiments, the trays 212 and 213 may be hingedly coupled to respective portions 215H of the attachment structure 215. Specifically, the portions 215H, which may be retention clips, allow the trays 212 and 213, which can snap into or out of the portions 215H, to tilt so that a technician can more easily access one of the trays 212 and 213 while they are both attached to the attachment structure 215. For example, such hinged/tiltable coupling to the attachment structure 215 may allow the technician to access a particular one of the trays 211-214 in a manner that reduces disturbance to others of the trays 211-214.

The trays 212 and 213 may be trays for fiber connection and/or storage. As shown in FIG. 2A, the tray 213 may hold one or more fiber optic tubes 220. The tray 211, on the other hand, may be a tray for power connectivity and may hold one or more power cables 230. In some embodiments, the tray 214 may be inside the tray 211. For example, the tray 214 may provide a compartment for power connectivity within the tray 211. As an example, the tray 214 may fit between opposite sidewalls of the tray 211 and may have a shorter sidewall height than the tray 211. Specifically, the tray 214 may be smaller than the tray 211 in each of width, height, and length dimensions. Additionally or alternatively, the trays 211 and 214 may (a) both be plastic trays, (b) both be metal trays, or (c) be different ones, respectively, of plastic and metal trays. The tray 211 may also be referred to herein as a "basket" for power connectivity.

In addition to protection provided by the enclosure 200, one or more of the trays 211-214 may be further protected by tray lids. For example, the trays 212, 213, and 214 may have removable protective lids 212L, 213L, and 214L, respectively, thereon (e.g., thereover). One or more of the lids 212L, 213L, and 214L may be transparent, thus allowing the technician to view tray contents before lid removal.

Referring to FIG. 2B, a top perspective view is shown of the tray 212 according to embodiments of the present inventive concepts. One or more optical fiber splice areas/terminals 212T may be in (e.g., attached to) the tray 212. Optical fibers (e.g., from one or more fiber optic tubes 220) may be connected to the optical fiber splice areas/terminals 212T, which thus may be referred to herein as "optical fiber tap offs." For example, the tray 212 may comprise one or more optical fiber splice modules 212M, each of which includes an area in which a plurality of optical fiber connections can be made. Although FIG. 2B illustrates an example in which the tray 212 has six of the optical fiber splice modules 212M, the tray 212 may instead have one, two, three, four, five, seven, or more of the optical fiber splice modules 212M. Moreover, FIG. 2B shows that the tray 212 can be stacked on top of the tray 213 while both trays are attached to the attachment structure 215.

Figure 2C:
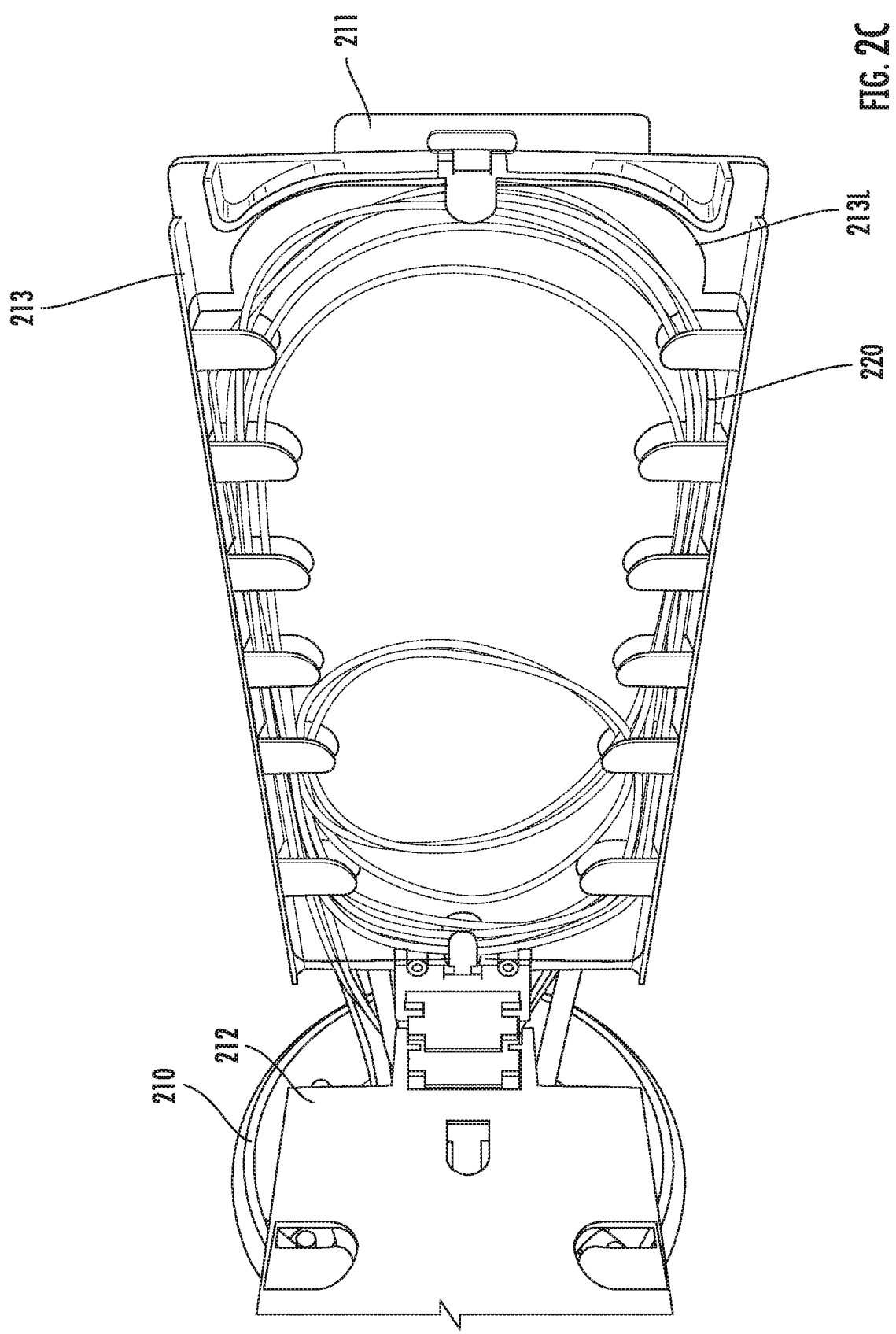

Referring to FIG. 2C, a top perspective view is shown of the tray 213 according to embodiments of the present inventive concepts. The tray 213 may comprise an optical fiber storage tray/area. For example, the tray 213 may have storage capacity for at least one meter, or at least two meters, of length of one or more fiber optic tubes 220. A jacket of a fiber optic tube 220 can subsequently be removed to reveal one or more optical fibers within the fiber optic tube 220. For example, each fiber optic tube 220 may include twelve optical fibers.

FIG. 2C also illustrates that the tray 213 can be stacked on top of the tray 211 while both trays are attached to the attachment structure 215. Moreover, the tray 212 (the bottom surface of which is shown in FIG. 2C) can be tilted upward while attached to the attachment structure 215, thus providing easier access for the technician to the tray 213 that is under the tray 212.

Referring to FIG. 2D, a top perspective view is shown of the tray 211 according to embodiments of the present inventive concepts. One or more power cables 230 may be in the tray 211. For example, the cable(s) 230 may extend a majority of a length of the tray 211 and may terminate in the tray 214 that is within the tray 211. The tray 213 (the bottom surface of which is shown in FIG. 2D) can be tilted upward while attached to the attachment structure 215, thus providing easier access for the technician to the trays 211 and 214 that are under the tray 213.

Figure 2E:
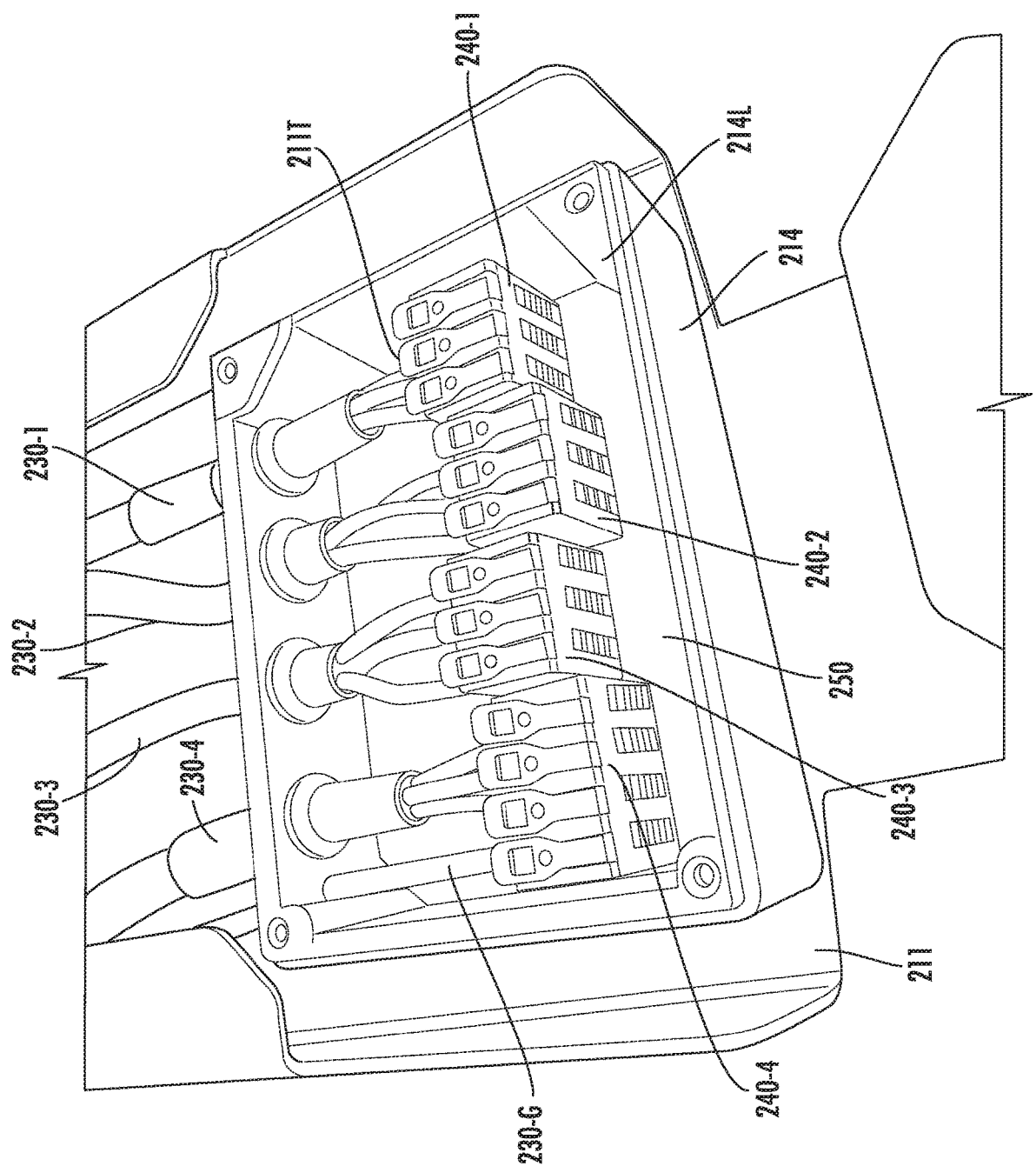

Referring to FIG. 2E, a top perspective view is shown of the tray 214 according to embodiments of the present inventive concepts. The tray 214 may house one or more power conductor terminals 211T. As an example, FIG. 2E illustrates a plurality of power ports 240, each of which has a plurality of conductor terminals 211T to which power cables 230 can be electrically connected. In particular, FIG. 2E shows an example in which four power ports 240-1, 240-2, 240-3, and 240-4 are housed inside the tray 214. Four power cables 230-1, 230-2, 230-3, and 230-4 are connected to the power ports 240-1, 240-2, 240-3, and 240-4, respectively. For example, the power ports 240-1 and 240-4 may comprise a power-in port and a power-out port, respectively, and the power ports 240-2 and 240-3 may be power tap ports. As an example, a voltage at each power-in/out port may be 380 V DC, and the power tap ports may feed adjacent utility poles and/or other remote nodes.

The tray 214 is not limited, however, to housing four power ports 240. Rather, the tray 214 may, in some embodiments, house one, two, three, five, or more power ports 240. Nor is the tray 214 limited to housing power tap ports that are located between a power-in port and a power-out port. Instead, one or more power tap ports may be located closer to a perimeter of the tray 214, and a power-in port and/or a power-out port may be closer to the middle of the tray 214.

The power ports 240 may be on power circuitry 250. For example, the power circuitry 250 may be a printed circuit board, or other wiring, that provides electrical connections for the power ports 240. As an example, the power circuitry 250 may electrically connect ground components of the cables 230 from the power ports 240 to a common ground connection 230-G. Additionally or alternatively, the power circuitry 250 may be configured to supply data, and/or power that exceeds 150 Watts, to and/or from the power ports 240. Although some devices, such as security cameras 180 (FIG. 1) or WiFi access points 140 (FIG. 1), can operate with power that is lower than 150 Watts, most devices that are coupled to the power ports 240 are configured to use power that exceeds 150 Watts. One example is small cell base stations 130 (FIG. 1), which may use power between 200 and 1,000 Watts.

Moreover, although FIG. 2E shows an example in which the power ports 240 may be connector blocks, each power port 240 may be any type of electrical port and is not limited to a connector block. Accordingly, the power ports 240 may be connectorized or non-connectorized ports. Additionally or alternatively, the tray 214 may house circuit breakers that comprise, or are electrically coupled to, the power ports 240, respectively. For example, the circuit breakers can be used in the place of connector blocks. The circuit breakers can facilitate individually turning off power at one or more of the power ports 240 instead of turning off power to the entire group. As an example, a circuit breaker can be used to turn off power to one tap port without affecting other tap ports or upstream/downstream elements, and thus can help facilitate maintenance. Examples of turning off power locally without exposing a technician and without cutting off power to downstream devices are provided in U.S. Patent Application No. 62/522,305, the entire disclosure of which is hereby incorporated by reference herein.

For safety purposes, the power ports 240 may be separate from the optical fiber tap offs 212T (FIG. 2B). In some embodiments in which the ports 240 are connectorized, however, the ports 240 may be combination ports that include both a power conductor terminal 211T and an optical fiber tap off 212T in the same connector block.

Figure 3:
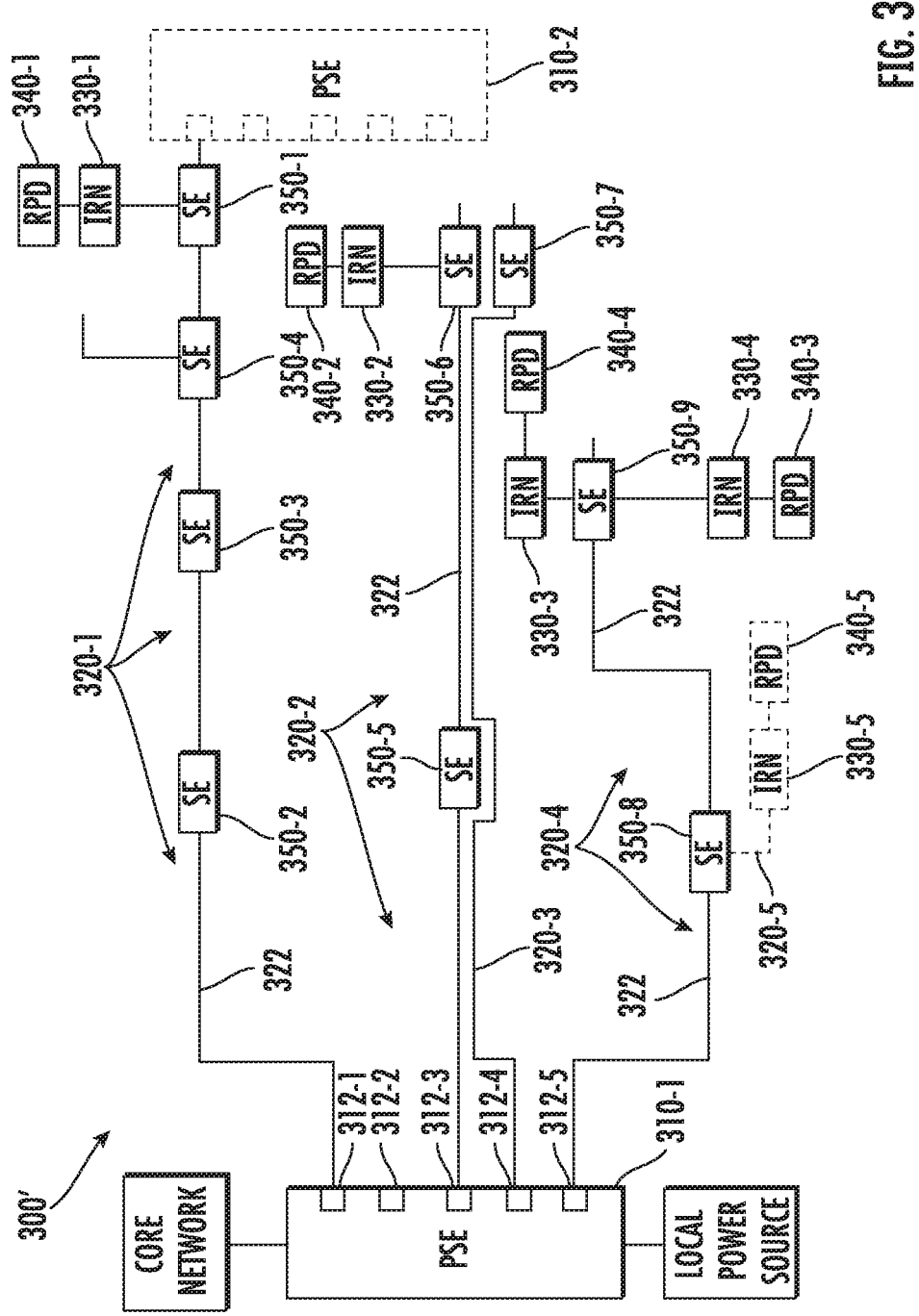
FIG. 3 is a schematic diagram illustrating a power and data connectivity micro grid according to embodiments of the present inventive concepts.

FIG. 3 is a schematic diagram illustrating a power and data connectivity micro grid 300' according to embodiments of the present inventive concepts. Examples of power and data connectivity micro grids are provided in U.S. Patent Application No. 62/700,350. The power and data connectivity micro grid 300', which is an example of an environment in which a power and fiber splice enclosure 200 (FIGS. 2A-2E and 5A-5C) according to embodiments of the present inventive concepts may be provided, includes a plurality of splice enclosures ("SE") 350. Accordingly, the power and fiber splice enclosure 200 is an example by which one or more of the splice enclosures 350 may be implemented.

The splice enclosures 350 may be installed at locations where intelligent remote distribution nodes ("IRN") 330 are deployed. The splice enclosures 350 may comprise hardened enclosures that include trays for both power conductors and for optical fibers. The splice enclosures 350 may be installed, for example, underground or above ground. Each splice enclosure 350 may further include a connectorized power input port and a connectorized data input port that are configured to receive a power-plus-fiber cable 320. The connectorized power input port and a connectorized data input port may be implemented as separate connectorized power and data ports or as a hybrid power-data connector.

Each splice enclosure 350 may also include one or more connectorized power output ports and one or more connectorized data output ports (which can be implemented as separate power and data ports or as hybrid power-data ports) that are configured to receive respective power-plus-fiber cables 320. In some embodiments, the ports on the splice enclosures 350 may not be connectorized. One pair of a power output port and a data output port may be viewed as a "pass-through" port and the remaining pairs of power and data output ports may be viewed as "tap" ports that may be used to provide power and data connectivity to individual remote network-connected devices (or co-located groups thereof). When a new remote powered device ("RPD") 340-5, such as a small cell base station 130 (FIG. 1), is to be deployed, an intelligent remote distribution node 330-5 may be installed at the site for the new small cell base station 340-5 (e.g., on a utility pole where the small cell radio 340-5 and antenna are mounted). A power-plus-fiber cable 320-5 may then be deployed between the newly-installed intelligent remote distribution node 330-5 and the closest splice enclosure 350-8 of the power and data connectivity micro grid 300', and a short jumper cable (or cables) may connect the intelligent remote distribution node 330-5 to the small cell radio 340-5. The splice enclosure 350-8 may be designed to output DC power signals (e.g., 380 V DC) to each output port thereof (i.e., the pass-through port and the tap ports). The intelligent remote distribution node 330-5 may include step-down equipment, such as a buck converter, that reduces the voltage level of the DC power signals delivered thereto from the splice enclosure 350-8 to a level that is suitable for powering the remote powered device 340-5 (e.g., 48-64 V DC). The intelligent remote distribution nodes 330-5 may or may not include pass-through power buses that allow daisy-chaining multiple intelligent remote distribution nodes 330-5 together.

To supply data connectivity to the newly-installed small cell base station 340-5, one or more of the optical fibers of power-plus-fiber cable 320-4 may be spliced in the splice enclosure 350-8 to connect to a data tap port of the splice enclosure 350-8. The data tap port of the splice enclosure 350-8 may be connected to a data input port on an intelligent remote distribution node 330-5 via, for example, a power-plus-fiber cable 320-5 or by a separate optical jumper cable. Electrical and optical paths in the intelligent remote distribution node 330-5 may connect the power conductors and optical fibers of the power-plus-fiber cable 320-5 to a local power port and a local data port, respectively, of the intelligent remote distribution node 330-5. The local power and data ports of the intelligent remote distribution node 330-5 are connected to the small cell base station 340-5 via, for example, separate power and optical jumper cables. In this fashion, the splice enclosure 350-8 and the intelligent remote distribution node 330-5 may provide power and data connectivity to the small cell base station 340-5.

The architecture of power and data connectivity micro grid 300' may be advantageous because the splice enclosures 350 may be relatively inexpensive, as they may include significantly less technology than an intelligent remote distribution node 330, and hence a plurality of splice enclosures 350 may be installed along a power-plus-fiber cable 320 at relatively low cost. The splice enclosures 350 may provide a plurality of tap points along each power-plus-fiber cable 320, thereby providing numerous locations where the cellular network operator may tap into the micro grid 300' to provide power and data connectivity for future installations. The splice enclosures 350 may be pre-installed along the power-plus-fiber cables 320, or slack loops may be included in the power-plus-fiber cables 320 and the splice enclosures 350 may be installed later as needed.

The present inventive concepts are not limited to embodiments in which an optical fiber data connection is provided to each remote powered device 340. For example, in some cases, PoE cables (or coaxial cables) may be used to provide power and data from an intelligent remote distribution node 330 to a remote powered device 340. PoE cables may be particularly useful in situations where the intelligent remote distribution nodes 330 are installed in close proximity to relatively low power remote powered devices 340. A security camera 180 (FIG. 1) is a good example of a remote powered device 340 that would typically be powered via a PoE cable rather than a power-plus-fiber cable, so long as the security camera 180 was close enough to the intelligent remote distribution node 330 that PoE power delivery could be used. Additionally, although the composite power-data cables 320 may be implemented as power-plus-fiber cables, other types of composite power-data cables 320, such as coaxial cables, may be used in some embodiments.

Each power-plus-fiber cable 320 may include a plurality of discrete cable segments 322. Each cable segment 322 may be connectorized with, for example, a fanout of individual power connectors and data connectors or with one or more hybrid power-data connectors. In some cases, the cable segments 322 may not be connectorized. Each cable segment 322 may include a plurality of optical fibers and at least a pair of electrical conductors (e.g., 12 AWG or 16 AWG copper conductors). Although typically both the optical fibers and the power conductors will be contained within a common protective jacket, in some embodiments, the power-plus-fiber cables 320 may be implemented as separate fiber optic and power cables that are co-installed with each other (e.g., routed through the same conduit).

A plurality of intelligent remote distribution nodes 330 may be installed along each power-plus-fiber cable 320. Remote powered devices 340, such as small cell base stations 130 (FIG. 1), WiFi access points 140 (FIG. 1), fixed wireless nodes 150 (FIG. 1), active cabinets 160 (FIG. 1), DSL distribution points 170 (FIG. 1), security cameras 180 (FIG. 1), and the like may be connected to respective ones of the intelligent remote distribution nodes 330. In some cases, a single remote powered device 340 may be connected to an intelligent remote distribution node 330, whereas in other cases multiple remote powered devices 340 may be connected to the same intelligent remote distribution node 330.

A power sourcing equipment ("PSE") device 310-1 may be provided that acts as an injection point for both power and data into the power and data connectivity micro grid 300'. The PSE device 310-1 may have hybrid power-data ports 312. In some embodiments, however, any or all of the hybrid power-data ports 312 may be replaced with separate power ports and data ports. Initially, only a single PSE device 310-1 may be provided, and then additional PSE devices 310 may be added as the micro grid 300' is expanded. One such additional PSE device 310-2 is shown with dotted lines in FIG. 3. Each PSE device 310 may be configured to output DC power through each hybrid power-data port 312 and to transmit and receive data through each hybrid power-data port 312. It should be noted that like elements may be designated with the same reference numeral in this specification and in the accompanying drawings. In some case, such like elements may be assigned two part reference numerals so that the elements may be referred to individually by their full reference numerals (e.g., PSE device 310-2)

or referred to collectively by the first part of their reference numeral (e.g., the PSE devices 310).

In some embodiments, one or more of the splice enclosures 350 of the power and data connectivity micro grid 300' may be a power and fiber splice enclosure 200 (FIGS. 2A-2E and 5A-5C) according to the present inventive concepts. Moreover, one or more of the cables 320 may be a cable 230 (FIGS. 2A, 2D, 2E, and 4) according to the present inventive concepts.

Figure 4:
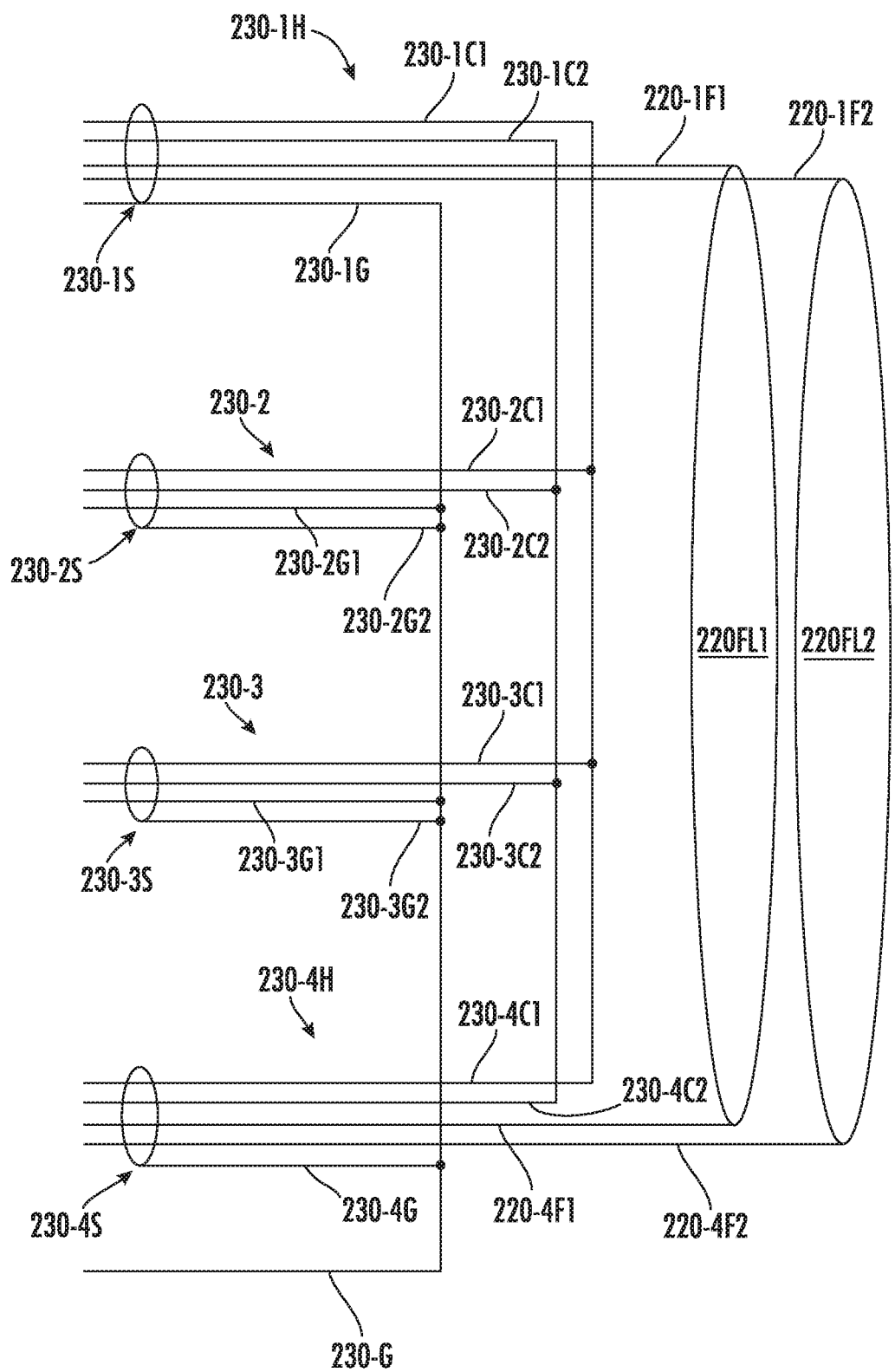
FIG. 4 is a schematic wiring diagram for cables for an enclosure according to embodiments of the present inventive concepts.

FIG. 4 is a schematic wiring diagram for cables for an enclosure 200 according to embodiments of the present inventive concepts. The cables may include wires of a cable 230-1H, a cable 230-2, a cable 230-3, and/or a cable 230-4H. The cable 230-1H may be, for example, an input hybrid cable that includes at least one power conductor and at least one fiber optic tube. As an example, the cable 230-1H may include a first power conductor wire 230-1C1, a second power conductor wire 230-1C2, a first fiber optic tube 220-1F1, and a second fiber optic tube 220-1F2. Moreover, the cable 230-1H may include a ground connection 230-1G, which may comprise, or be connected to, a conductive grounding screen 230-1S. The conductive grounding screen 230-1S may be a flexible aluminum corrugated shield that surrounds the first and second power conductor wires 230-1C1, 230-1C2 and the first and second fiber optic tubes 220-1F1, 220-1F2. Advantageously, the conductive grounding screen 230-1S may facilitate using the cable 230-1H to transmit higher power in compliance with National Electrical Safety Code® (NESC®) Rules 224B and 344.

The first and second fiber optic tubes 220-1F1 and 220-1F2 may split off from the cable 230-1H inside the enclosure 200 before reaching any of the trays 211-214. After separating from the rest of the cable 230-1H, the first and second fiber optic tubes 220-1F1 and 220-1F2 may be connected/stored in the tray 212 and/or the tray 213. The first and second power conductor wires 230-1C1 and 230-1C2, along with the ground connection 230-1G, may collectively provide the cable 230-1 (FIG. 2E) and may be connected to the power port 240-1 (FIG. 2E) inside the tray 211 and/or the tray 214. In particular, the tray 211 and/or the tray 214 may be free of any fiber optic tube 220 stored therein and free of any optical fiber splices/connections. The tray 211 and/or the tray 214 may thus be referred to herein as "fiber-free," as no optical fiber may be stored or connected therein. Similarly, the trays 212 and 213 may have no power conductor connectivity therein, and thus may be referred to herein as "power-free." By providing such a strict demarcation between power and fiber, the trays 211-214 of the enclosure 200 can enhance safety for a technician who accesses the fiber.

The cable 230-2 may be, for example, a cable that is connected to a power tap (e.g., tap off) port, such as a port 240-2 (FIG. 2E). Accordingly, the cable 230-2 may include power conductors but not fiber optic tube 220. As an example, the cable 230-2 may include a first power conductor wire 230-2C1 and a second power conductor wire 230-2C2. In some embodiments, however, the cable 230-2 may be a hybrid cable that further includes fiber optic tube 220. Moreover, the cable 230-2 may include one or more ground connections, such as a ground connection 230-2G1 and a ground connection 230-2G2. The ground connection 230-2G2 may comprise, or be connected to, a conductive grounding screen 230-2S, which may be a flexible corrugated shield.

The cable 230-3 may be, for example, a cable that is connected to a power tap (e.g., tap off) port, such as a port 240-3 (FIG. 2E). As an example, the cable 230-3 may include a first power conductor wire 230-3C1 and a second power conductor wire 230-3C2. Moreover, the cable 230-3 may include one or more ground connections, such as a ground connection 230-3G1 and a ground connection 230-3G2. The ground connection 230-3G2 may comprise, or be connected to, a conductive grounding screen 230-3S, which may be a flexible corrugated shield.

The cable 230-4H may be, for example, an output hybrid cable that includes at least one power conductor and at least one fiber optic tube. As an example, the cable 230-4H may include a first power conductor wire 230-4C1, a second power conductor wire 230-4C2, a first fiber optic tube 220-4F1, and a second fiber optic tube 220-4F2. Moreover, the cable 230-4H may include a ground connection 230-4G, which may comprise, or be connected to, a conductive grounding screen 230-4S (e.g., a flexible corrugated shield).

The first and second fiber optic tubes 220-4F1 and 220-4F2 may split off from the cable 230-4H inside the enclosure 200 before reaching any of the trays 211-214. After separating from the rest of the cable 230-4H, the first and second fiber optic tubes 220-4F1 and 220-4F2 may be connected/stored in the tray 212 and/or the tray 213. The first and second power conductor wires 230-4C1 and 230-4C2, along with the ground connection 230-4G, may collectively provide the cable 230-4 (FIG. 2E) and may be connected to the power port 240-4 (FIG. 2E) inside the tray 211 and/or the tray 214.

The ground connections 230-1G, 230-2G1, 230-2G2, 230-3G1, 230-3G2, and 230-4G may be coupled to a common ground connection 230-G that connects to a common ground terminal 210G (FIG. 2A) that is on a base portion 210 of an enclosure 200. The common ground connection 230-G may also be referred to herein as an "earth-to-enclosure earth connection."

The power conductor wires 230-1C1, 230-1C2, 230-2C1, 230-2C2, 230-3C1, 230-3C2, 230-4C1, and 230-4C2, which may be copper (or other metal conductor) wires, may be connected to respective power conductor terminals 211T (FIG. 2E). The power conductor wires 230-1C1, 230-1C2, 230-2C1, 230-2C2, 230-3C1, 230-3C2, 230-4C1, and 230-4C2 and power conductor ports 240 (FIG. 2E) may each be rated/configured to supply power exceeding 150 Watts. The terminals 211T may be terminals of the ports 240 and/or of other components/nodes on a circuit, such as the power circuitry 250 (FIG. 2E).

The first fiber optic tubes 220-1F1 and 220-4F1 may comprise, or be connected to, a first fiber loop 220FL1. Also, the second fiber optic tubes 220-1F2 and 220-4F2 may comprise, or be connected to, a second fiber loop 220FL2.

Figure 5A:
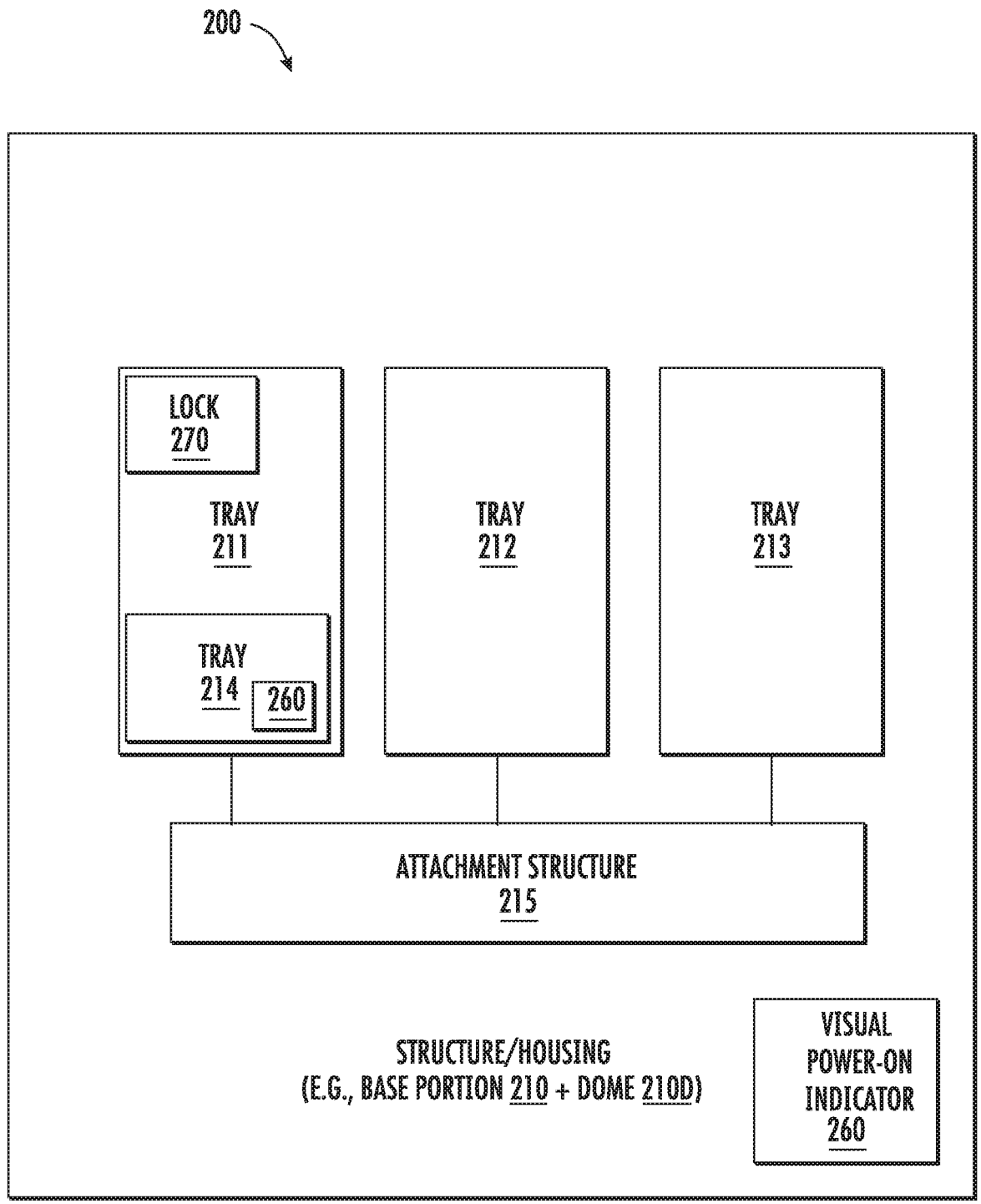
FIGS. 5A-5C are block diagrams of a power and fiber splice enclosure according to embodiments of the present inventive concepts.
Figure 5B:
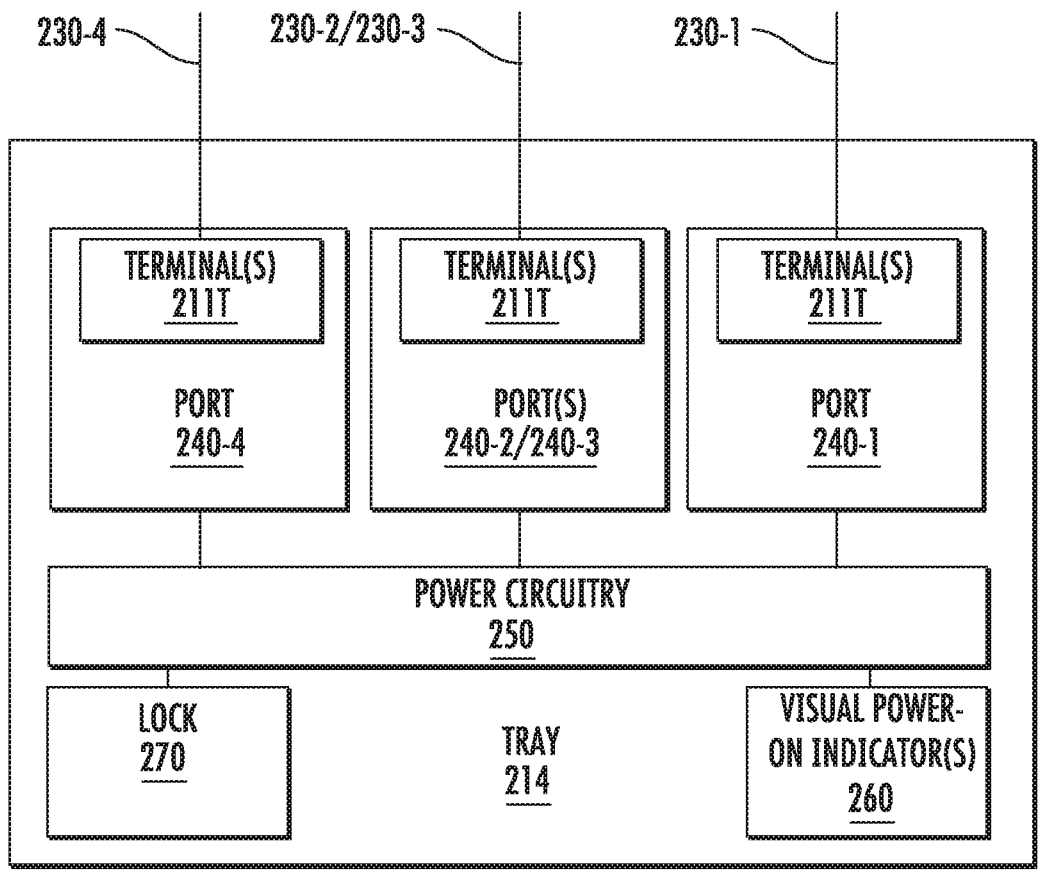
Figure 5C:
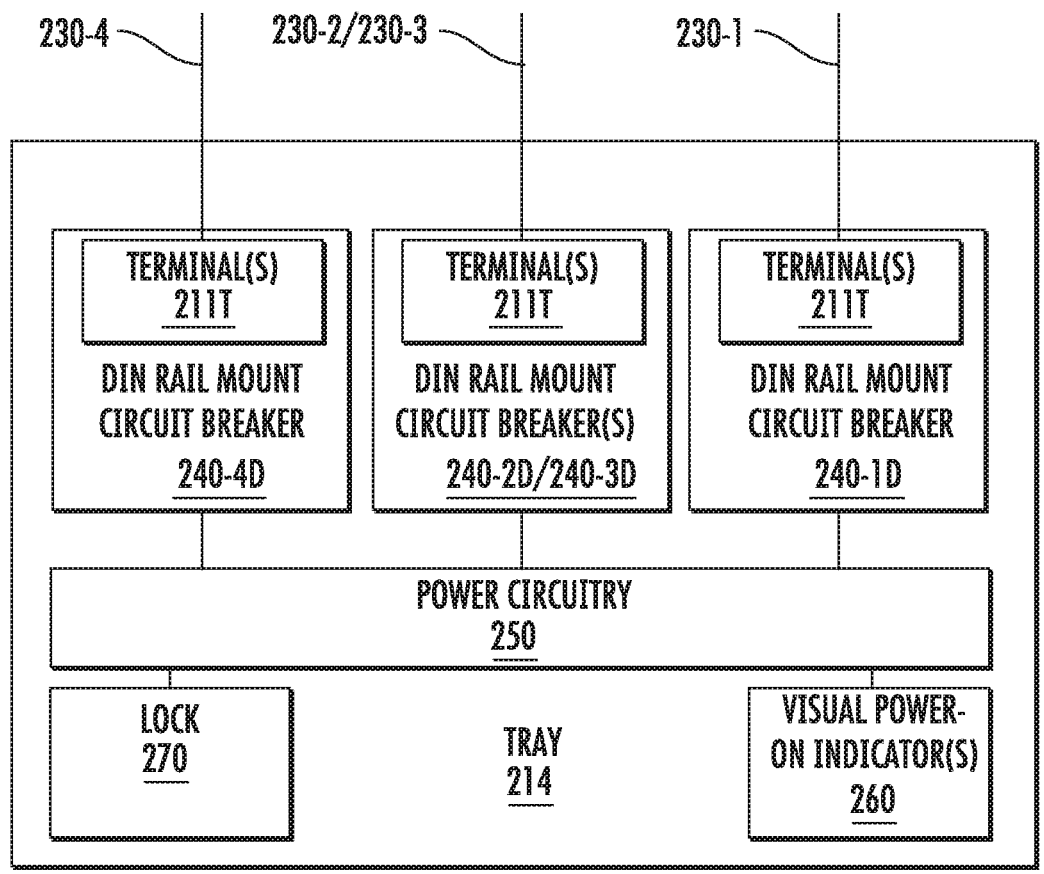

FIGS. 5A-5C are block diagrams of a power and fiber splice enclosure 200 according to embodiments of the present inventive concepts. Referring to FIG. 5A, the enclosure 200 may comprise a structure (e.g., a pipe) that encloses first through fourth trays 211-214, which may be attached to an attachment structure 215 inside the enclosure 200. Specifically, FIG. 5A shows that the structure (e.g., outer housing) of the enclosure 200 may comprise a base portion 210 and a dome 210D, which is removed in FIGS. 2A-2E for convenience of illustrating the trays 211-214. FIG. 5A also shows that the fourth tray 214 may be in (e.g., inside a perimeter of) the first tray 211.

In some embodiments, the enclosure 200 may include one or more visual power-on warning indicators 260. For example, an indicator 260 may be a light, such as a light-emitting diode (LED), that is inside the electrical termination area in the tray 211/214 and/or on an interior or exterior surface of the base portion 210. The indicator 260 may be configured to indicate to a technician, or other person accessing the enclosure 200, that one or more power conductor terminals 211T (FIGS. 2E, 5B, and 5C) are energized. As an example, the indicator 260 may illuminate in response to power being on at any power tap port in the tray 211/214. In some embodiments, each power tap port in the tray 211/214 may have a respective indicator 260 that indicates whether power is on at that power tap port.

Additionally or alternatively, the enclosure 200 may include a locking mechanism 270 that is configured to automatically lock in response to one or more power conductor terminals 211T being energized, thus protecting a technician from voltages inside the tray 211/214. For example, the locking mechanism 270 may be a lock that holds the lid 214L (FIGS. 2A, 2D, and 2E) in place. Accordingly, the locking mechanism 270, which may be a magnetic lock, a bolt lock, or another type of lock, may be at one of various locations in/on the tray 211/214. In some embodiments, the locking mechanism 270 and/or the indicator 260 may be controlled by the circuitry 250 or by separate control circuitry (e.g., a processor) that is inside the tray 211/214.

Referring to FIG. 5B, a block diagram of the tray 214 shows that the tray 214 may include a plurality of ports 240, each of which may include one or more power conductor terminals 211T. For example, the port 240-1 may be a power-in port that includes power conductor terminal(s) 211T configured to receive a power cable 230-1. The power cable 230-1 may be a power input cable. Similarly, the port 240-4 may be a power-out port that includes power conductor terminal(s) 211T configured to receive a power cable 230-4, which may be a power output cable.

The tray 214 may also include one or more power tap ports, such as the port 240-2 and/or the port 240-3. The ports 240-2 and 240-3 include power conductor terminal(s) 211T configured to receive respective cables 230-2 and 230-3, which may be tap off cables at respective power tap offs. Moreover, although the discussion of FIG. 5B provides an example in which one or more tap ports may be between the power-in and power-out ports in the tray 214, the location of any of the ports 240-1, 240-2, 240-3, and/or 240-4 may be rearranged in the tray 214. For example, the ports 240-1 and 240-4 may be power tap ports, and the ports 240-2 and 240-3 may be power-in/out ports.

Some embodiments may provide a chain of enclosures 200. The last enclosure 200 in the chain may have only one power-in port and only one power tap port, or one power-in port and multiple power tap ports. Moreover, some enclosures 200 may include more than one power tap port (for multiple devices) and/or more than one power-out port (for providing power to another location, and thus supporting complex distribution configurations). For example, some enclosures 200 may include three or more power tap ports and/or two or more power-out ports.

In some embodiments, power circuitry 250 may be included in the tray 214. The power circuitry 250 may be electrically coupled to one or more of the ports 240. The power circuitry 250 may be implemented as a printed circuit board, or other wiring, that provides electrical connections for the ports 240. For example, the power circuitry 250 may include, or be electrically coupled to, surge protection circuitry, circuit breaker circuitry, and/or other circuitry that is configured to control the supply of power that exceeds 150 Watts. As an example, the surge protection circuitry may comprise a device that clamps voltages for power-input/output ones of the ports 240.

Although one example of a port 240 is a connector block, which may be referred to herein as a "connectorized" port, the ports 240 are not limited to connector blocks. Rather, one or more of the ports 240 may be non-connectorized ports.

For example, as shown in the block diagram of FIG. 5C (which is a modification of FIG. 5B), one or more DIN rail mount circuit breakers 240-1D, 240-2D, 240-3D, and 240-4D may be used instead of using connector blocks as the ports 240. Each DIN rail mount circuit breaker is mounted on a DIN rail that is inside the tray 214. Also, each DIN rail mount circuit breaker may comprise one or more power conductor terminals 211T, and may advantageously provide a mechanism for breaking/unbreaking a switch and be relatively inexpensive. Although the DIN rail mount circuit breakers 240-1D, 240-2D, 240-3D, and 240-4D are illustrated in FIG. 5C as one example, some embodiments may additionally or alternatively provide surge protection on the DIN rail. Accordingly, one or more DIN rail mount surge protectors may be mounted on the DIN rail that is inside the tray 214.

A power and fiber splice enclosure 200 according to embodiments of the present inventive concepts may provide a number of advantages. These advantages include providing both data (e.g., via optical fiber) and power connectivity. For example, a tray 211 and/or a tray 214 of the enclosure 200 may be dedicated to power connectivity rather than data connectivity, which may enhance safety for a technician who is trained to handle optical fiber but not power conductors. Safety may be further enhanced by using tray lids 212L, 213L, and/or 214L (FIGS. 2A-2E) to isolate the technician from contents covered thereby. Additionally or alternatively, the enclosure 200 may incorporate a power-on indicator 260 and/or a locking mechanism 270 to aid in protecting the technician. Moreover, the advantages may include providing a DIN rail inside the tray 211/214 to inexpensively facilitate adding a circuit breaker and/or a surge protector.

FIGS. 6A-6G and 7 illustrate features that can enhance safety for a technician who accesses a power conductor (or who otherwise connects power to/from an enclosure). Though these features may be included in a power and fiber splice enclosure 200 (FIG. 2A) according to embodiments of the present inventive concepts, they can also be used in fiber-free cable enclosures. For example, these features can be used in systems that convert and/or supply power, including microgrid (e.g., solar microgrid) systems.

Figure 6A:
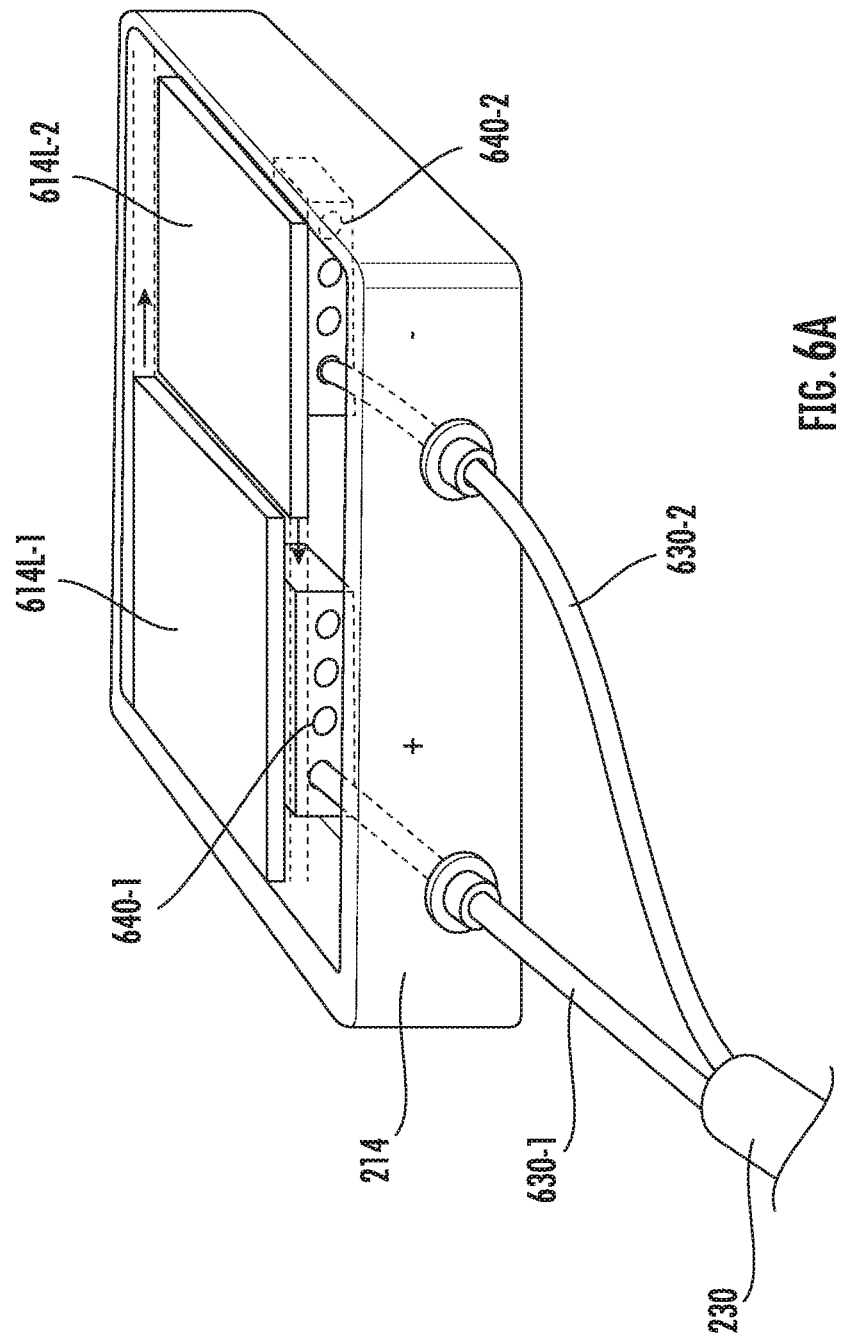
FIG. 6A is a front perspective view of a tray that includes slidable lids according to embodiments of the present inventive concepts.

FIG. 6A is a front perspective view of a tray 214 that includes multiple slidable protective lids 614L-1 and 614L-2 according to embodiments of the present inventive concepts. The lids 614L-1 and 614L-2 may be between an access opening in the tray 214 and power conductor terminal blocks 640-1 and 640-2, respectively, that are in the tray 214. In some embodiments, the lids 614L-1 and 614L-2 may be smaller lids that are both under a larger lid 214L (FIG. 2E), which is omitted from view in FIG. 6A for simplicity of illustration. The larger lid 214L may cover the access opening in the tray 214. Moreover, in some embodiments, the smaller lids 614L-1 and 614L-2 may be used instead of, rather than in addition to, the larger lid 214L.

Advantageously, the lids 614L-1 and 614L-2 may inhibit a technician from simultaneously touching a positive power conductor wire 630-1 and a negative power conductor wire 630-2 of a power cable 230. For example, to connect the positive power conductor wire 630-1 to the terminal block 640-1, the technician can slide the lid 614L-1 to the right to uncover the terminal block 640-1 without uncovering the terminal block 640-2. Similarly, to connect the negative power conductor wire 630-2 to the terminal block 640-2, the technician can slide the lid 614L-2 to the left to uncover the terminal block 640-2 without uncovering the terminal block 640-1.

Though some examples herein describe the lids 614L-1 and 614L-2 as being slidable, they may alternatively be any other type of movable and/or removable lid, including hinging lids or liftoff lids. In embodiments in which the lids 614L-1 and 614L-2 are slidable, they may be attached to the tray 214 by one of various sliding mechanisms, including tracks or grooves on sidewalls of the tray 214. Moreover, like the lid 214L, the lids 614L-1 and 614L-2 may be transparent, thus allowing the technician to view tray contents before lid movement.

Figure 6B:
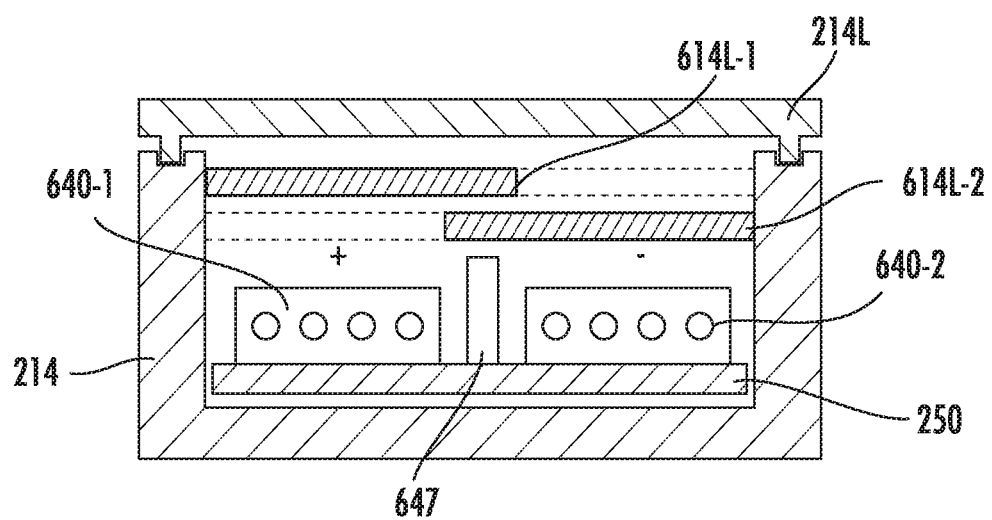
FIG. 6B is a cross-sectional view of FIG. 6A, with a removable lid over the slidable lids.
Figure 6C:
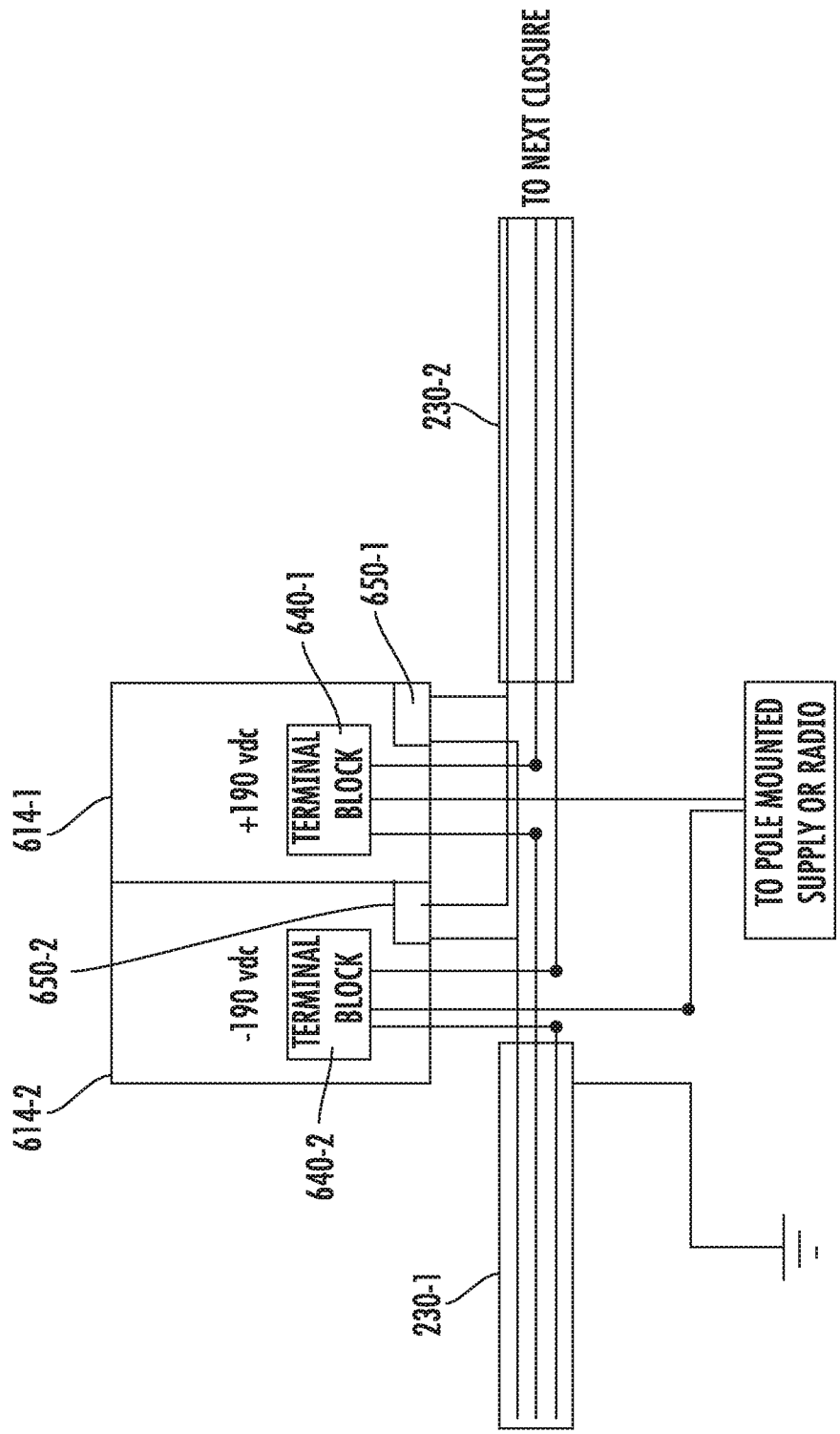
FIG. 6C is a schematic diagram of power termination according to embodiments of the present inventive concepts.
Figure 6D:
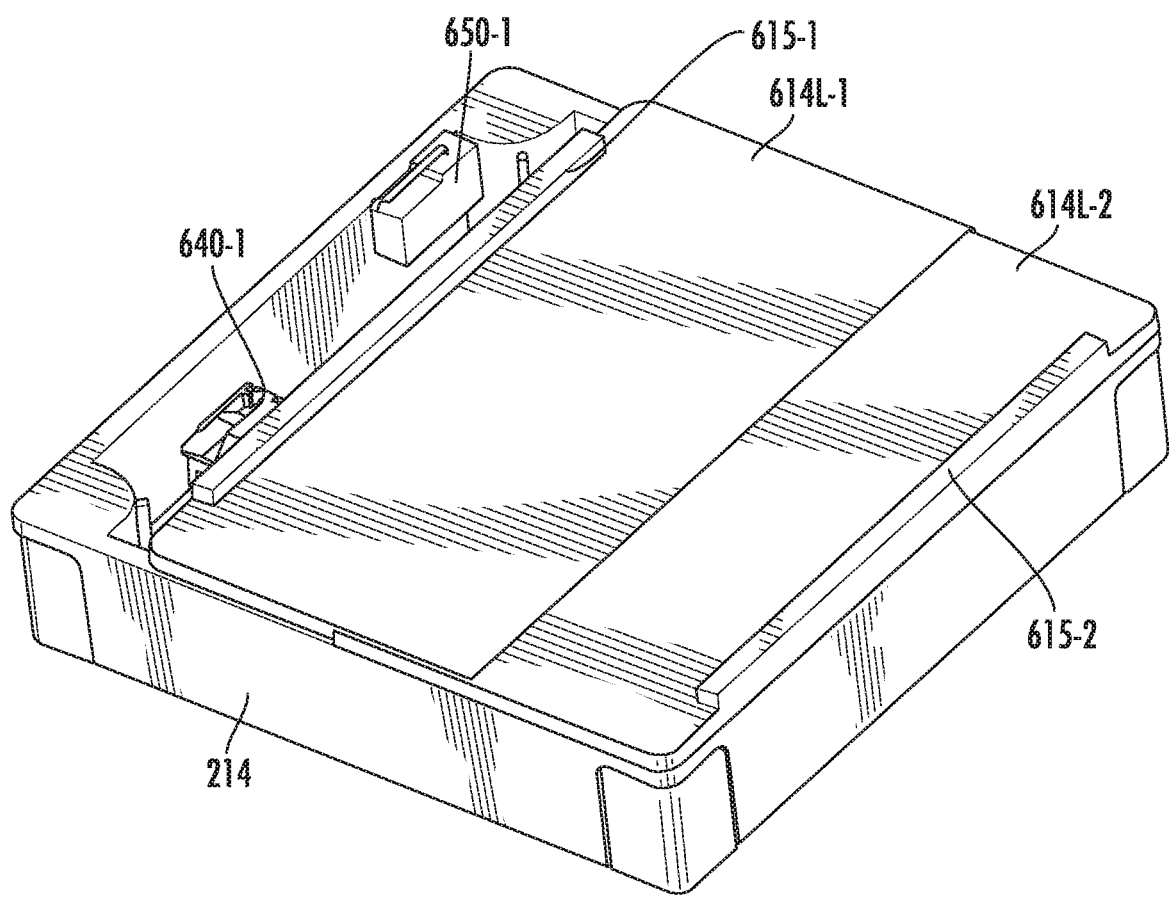
FIGS. 6D and 6E are top perspective views of a tray that has multiple lids thereon according to embodiments of the present inventive concepts.

In some embodiments, a top surface of each of the lids 614L-1 and 614L-2 may have a rib (e.g., a grip 615 as shown in FIG. 6D) that the technician can grip to open and close the lids 614L-1 and 614L-2. Additionally or alternatively, each of the lids 614L-1 and 614L-2 may have a vertically-protruding post that limits how far the lids 614L-1 and 614L-2 can slide.

FIG. 6B is a cross-sectional view of FIG. 6A, with a removable lid 214L over the slidable lids 614L-1 and 614L-2. The lid 214L may be a sealing cover that covers an access opening in the tray 214 to protect contents of the tray 214, including power circuitry 250 and power conductor terminal blocks 640-1 and 640-2, from dust and liquids and the like. For example, using the lid 214L on the tray 214 may help provide an Ingress Protection (IP) rating of at least IP54 and/or a National Electrical Manufacturers Association (NEMA) rating of at least NEMA 4X. In some embodiments, an enclosure 200 (FIG. 2A) may be rated IP68 or higher. Moreover, the lid 614L-1 may be between the lid 214L and the terminal block 640-1, and the lid 614L-2 may be between the lid 214L and the terminal block 640-2.

In some embodiments, each of the terminal blocks 640-1 and 640-2 may be one of the power ports 240-1, 240-2, 240-3, or 240-4 (FIG. 2E). Moreover, in some embodiments, the terminal block 640-1 may be a positive conductor terminal block in which each conductor terminal is a positive terminal. Likewise, the terminal block 640-2 may be a negative conductor terminal block in which each conductor terminal is a negative terminal.

Each of the terminal blocks 640-1 and 640-2 may, in some embodiments, be an Insulation Displacement (IDC) terminal block or a wire-piercing terminal block, which may ensure that no metallic portion of a wire is exposed, thus enhancing safety for a technician. Examples of electrical connection devices that can enhance technician safety are discussed in PCT Publication No. WO/2018/236969, the entire disclosure of which is hereby incorporated by reference herein.

The lid 614L-1 may vertically overlap a portion of the lid 614L-2 when the lids 614L-1 and 614L-2 are closed. This overlap may further inhibit a technician from simultaneously touching positive and negative power conductor wires 630-1 and 630-2 (FIG. 6A) of the respective terminal blocks 640-1 and 640-2. In some embodiments, the lid 614L-1 may slide horizontally from a closed position to an open position in which the lid 614L-1 vertically overlaps the majority of the top surface of the lid 614L-2. Similarly, the lid 614L-2 may slide horizontally from a closed position to an open position in which the lid 614L-2 vertically underlaps the majority of the bottom surface of the lid 614L-1.

FIG. 6C is a schematic diagram of a power termination example according to embodiments of the present inventive concepts. In particular, FIG. 6C illustrates power conductor terminal blocks 640-1 and 640-2 that can be covered by the lids 614L-1 and 614L-2 (FIGS. 6A and 6B), respectively, which are omitted from view for simplicity of illustration. In some embodiments, movement (e.g., sliding) of the lids 614L-1 and 614L-2 can be detected by safety elements 650-1 and 650-2, respectively, each of which may include a switch, sensor (e.g., motion sensor), and/or contact. For example, the safety element 650-1 may be configured to cut off power (e.g., positive 190 Volts DC) in a cable enclosure in response to detecting movement of the lid 614L-1, and/or the safety element 650-2 may be configured to cut off power (e.g., negative 190 Volts DC) in the cable enclosure in response to detecting movement of the lid 614L-2. In some embodiments, the safety elements 650-1 and 650-2 may disconnect/block power in a tray 214 (FIG. 6B) in response to detecting that both of the lids 614L-1 and 614L-2 are open at the same time.

Each of the safety elements 650-1 and 650-2 may be mounted inside a power termination box. For example, power circuitry 250 in a tray 214 (FIG. 6B) may comprise the safety elements 650-1 and 650-2. Moreover, the safety elements 650-1 and 650-2 may be positioned/connected relative to the respective terminal blocks 640-1 and 640-2 such that the safety elements 650-1 and 650-2 are difficult for a technician to bypass. For example, the safety elements 650-1 and 650-2 can be at various positions in the tray 214 as long as they are electrically connected between power (e.g., 190 Volts) and the terminal blocks 640-1 and 640-2, respectively.

A structural divider 647 (FIG. 6B) may be between the terminal blocks 640-1 and 640-2. For simplicity of illustration, the divider 647 is omitted from view in FIG. 6A. The divider 647 may help to physically isolate the terminal blocks 640-1 and 640-2 from each other, and thus may protect a technician's hand from accidentally touching the terminal block 640-1 while accessing the terminal block 640-2, and vice versa. In some embodiments, the divider 647 may be a wall that separates the terminal blocks 640-1 and 640-2. Accordingly, the terminal blocks 640-1 and 640-2 may be in different compartments 614-1 and 614-2, respectively, in the tray 214 (FIG. 6B). In some embodiments, the compartments 614-1 and 614-2 may be respective trays that are within the tray 214.

As is further shown in FIG. 6C, the terminal block 640-1 may receive positive power conductor wires from respective power cables 230-1 and 230-2. Similarly, the terminal block 640-2 may receive negative power conductor wires from the respective power cables 230-1 and 230-2. The power cables 230-1 and 230-2 may also each be electrically connected to both of the safety elements 650-1 and 650-2.

Separating the positive power conductor wires from the negative power conductor wires at the different respective terminal blocks 640-1 and 640-2 can increase safety by reducing the likelihood that a technician will simultaneously touch both a positive power conductor wire and a negative power conductor wire. As described with respect to FIGS. 6A and 6B, technician safety can be further improved by using vertically-overlapping lids 614L-1 and 614L-2 that can be slidably attached to a tray 214, such that only one of the terminal blocks 640-1 and 640-2 is accessible at a time. Moreover, any access by the technician to an area covered by either of the lids 614L-1 and 614L-2 can trigger one of the safety elements 650-1 and 650-2. Accordingly, when the technician adds a new copper wire to the terminal block 640-1 or the terminal block 640-2, or otherwise accesses the tray 214, various features shown in FIGS. 6A-6C can protect the technician from harm.

Figure 6E:
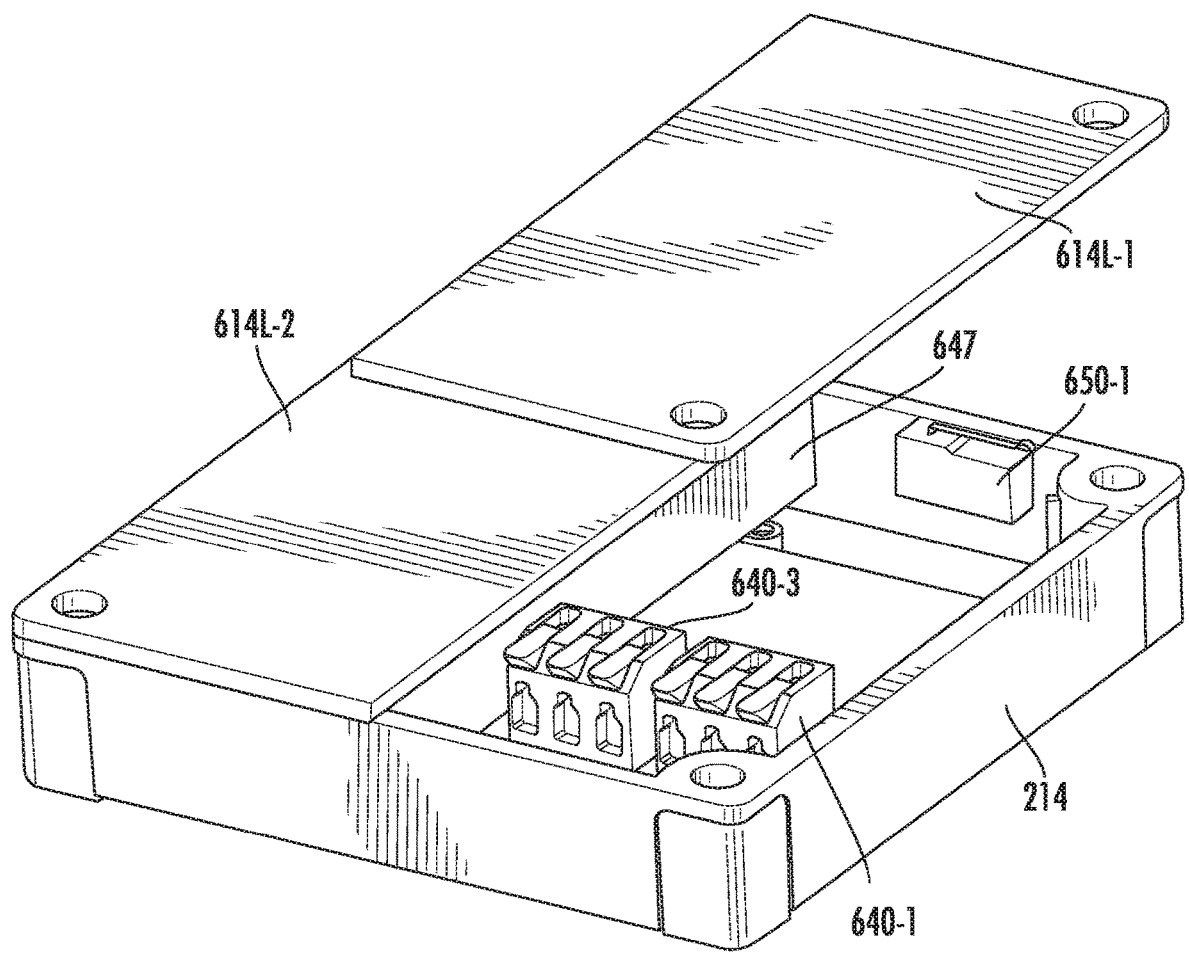

FIGS. 6D and 6E are top perspective views of a tray 214 that has multiple lids 614L-1 and 614L-2 thereon according to embodiments of the present inventive concepts. As shown in FIGS. 6D and 6E, a safety element 650-1 may be on an internal sidewall of the tray 214 in some embodiments. The safety element 650-1 may be, for example, a switch that controls one or more relays to break power off or to reconnect power. The relay(s) may be in a power cabinet or can be local to the safety element 650-1.

As shown in FIG. 6D, the lid 614L-1 may be a slidable lid that includes a grip 615-1 that a technician can use as a handle to slide the lid 614L-1 open or closed over a power conductor terminal block 640-1. The lid 614L-2 may likewise be a slidable lid that includes a grip 615-2. In some embodiments, one (or both) of the grips 615-1 and 615-2 may provide a vertical post/stop that limits how far the other of the lids 614L-1 and 614L-2 can slide horizontally.

Moreover, as shown in FIG. 6E, the lids 614L-1 and 614L-2 may, in some embodiments, be liftoff lids or hinged lids rather than slidable lids. FIG. 6E also illustrates a structural divider 647 that separates the terminal block 640-1 (and/or a terminal block 640-3) from contents that are covered by the lid 614L-2. Additionally or alternatively, the examples shown in FIGS. 6D and 6E may include either a single enclosure/box (e.g., only the tray 214) for both positive and negative conductor termination or a dual enclosure/two boxes (e.g., separate trays) for positive and negative conductor termination, respectively.

Figure 6F:
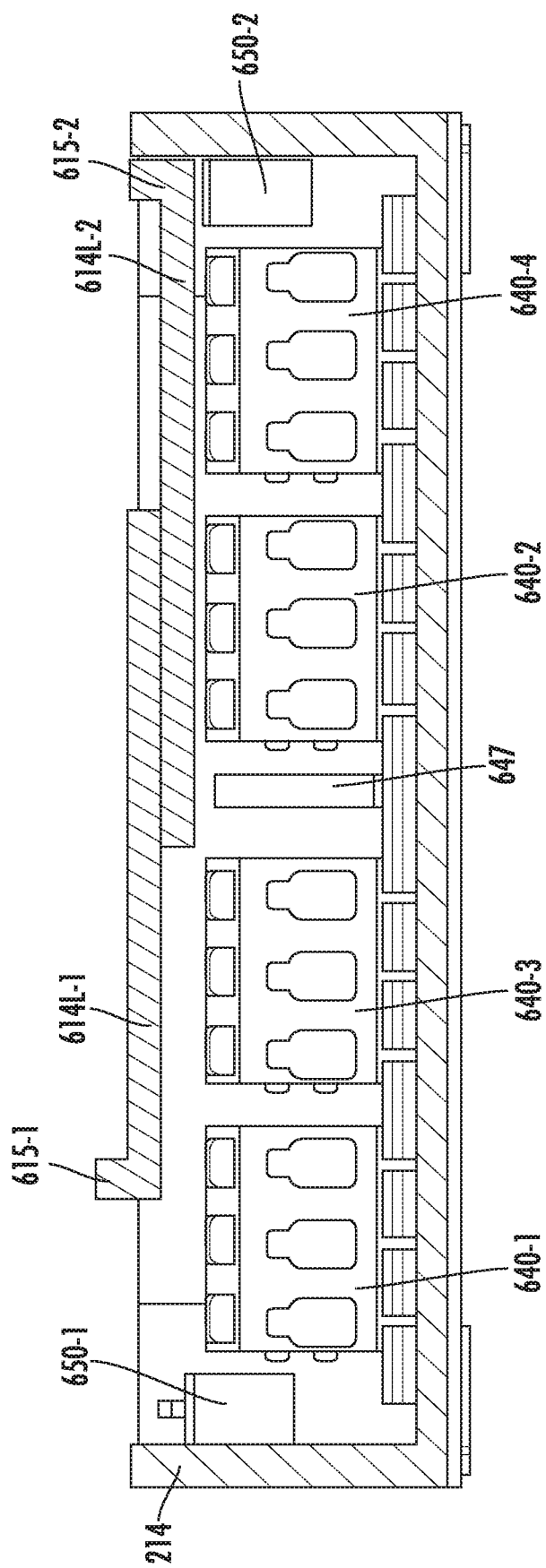
FIG. 6F is a cross-sectional view of FIG. 6D.

FIG. 6F is a cross-sectional view of FIG. 6D. As shown in FIG. 6F, the lid 614L-1 may be over multiple terminal blocks 640-1 and 640-3, and the lid 614L-2 may be over multiple terminal blocks 640-2 and 640-4. The terminal blocks 640-1 through 640-4 may each include two, three, four, or more input terminals, as well as two, three, four, or more output terminals. In some embodiments, the terminal blocks 640-1 and 640-3 under the lid 614L-1 may be positive (e.g., positive 190 Volts DC) conductor terminal blocks, and the terminal blocks 640-2 and 640-4 under the lid 614L-2 may be negative (e.g., negative 190 Volts DC) conductor terminal blocks. Accordingly, the lids 614L-1 and 614L-2 can provide individual covers for positive and negative conductor termination, respectively.

Figure 6G:
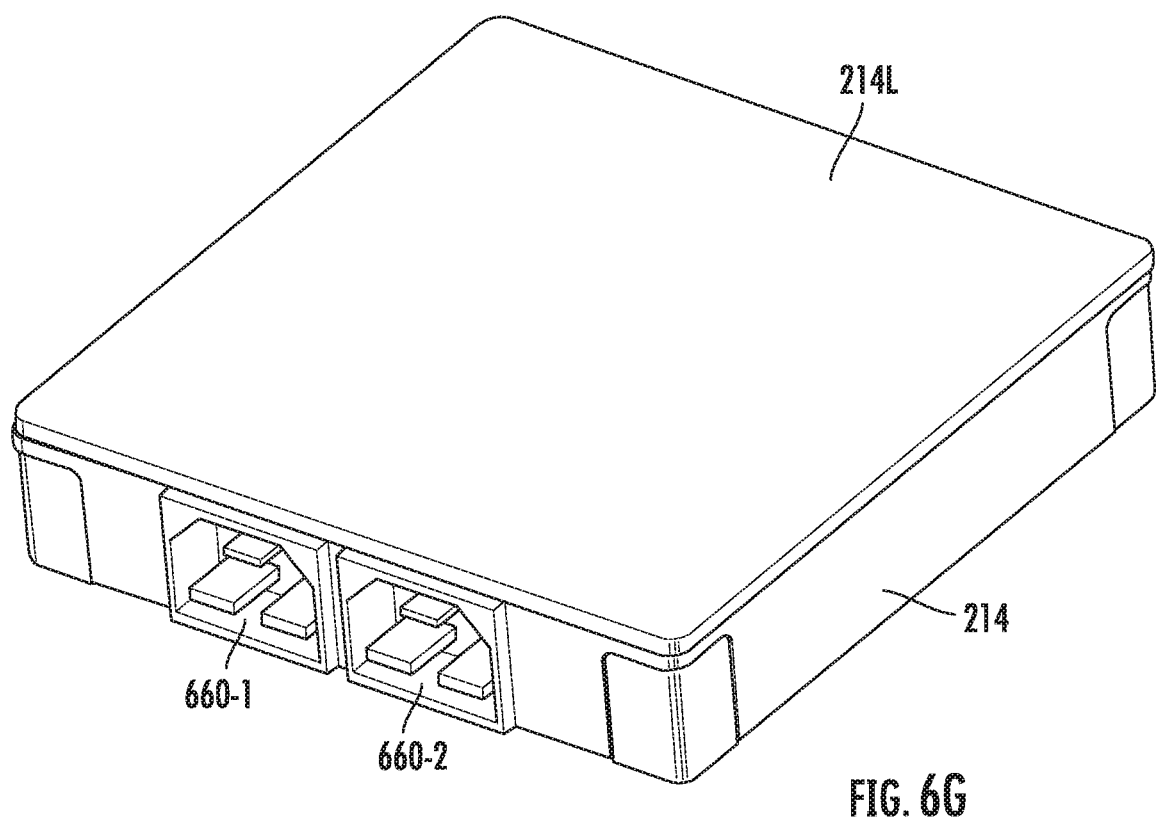
FIG. 6G is a top perspective view of a tray that has one or more power plugs on an external surface thereof according to embodiments of the present inventive concepts.

FIG. 6G is a top perspective view of a tray 214 that has one or more power plugs 660-1/660-2 on an external surface thereof according to embodiments of the present inventive concepts. For example, the power plugs 660-1 and 660-2 may be on an external sidewall of the tray 214. In some embodiments, the power plugs 660-1 and 660-2 may be positive (e.g., positive 190 Volts DC) and negative (e.g., negative 190 Volts DC) power plugs, respectively. Because the power plugs 660-1 and 660-2 are on the outside of the tray 214, a single lid 214L may be used instead of multiple lids that cover positive and negative conductor termination, respectively, inside the tray 214. The lid 214L does not need to be removed to connect to positive/negative power (e.g., 190 Volts DC). Rather, a technician can plug directly into one or more of the power plugs 660-1 and 660-2.

Figure 7:
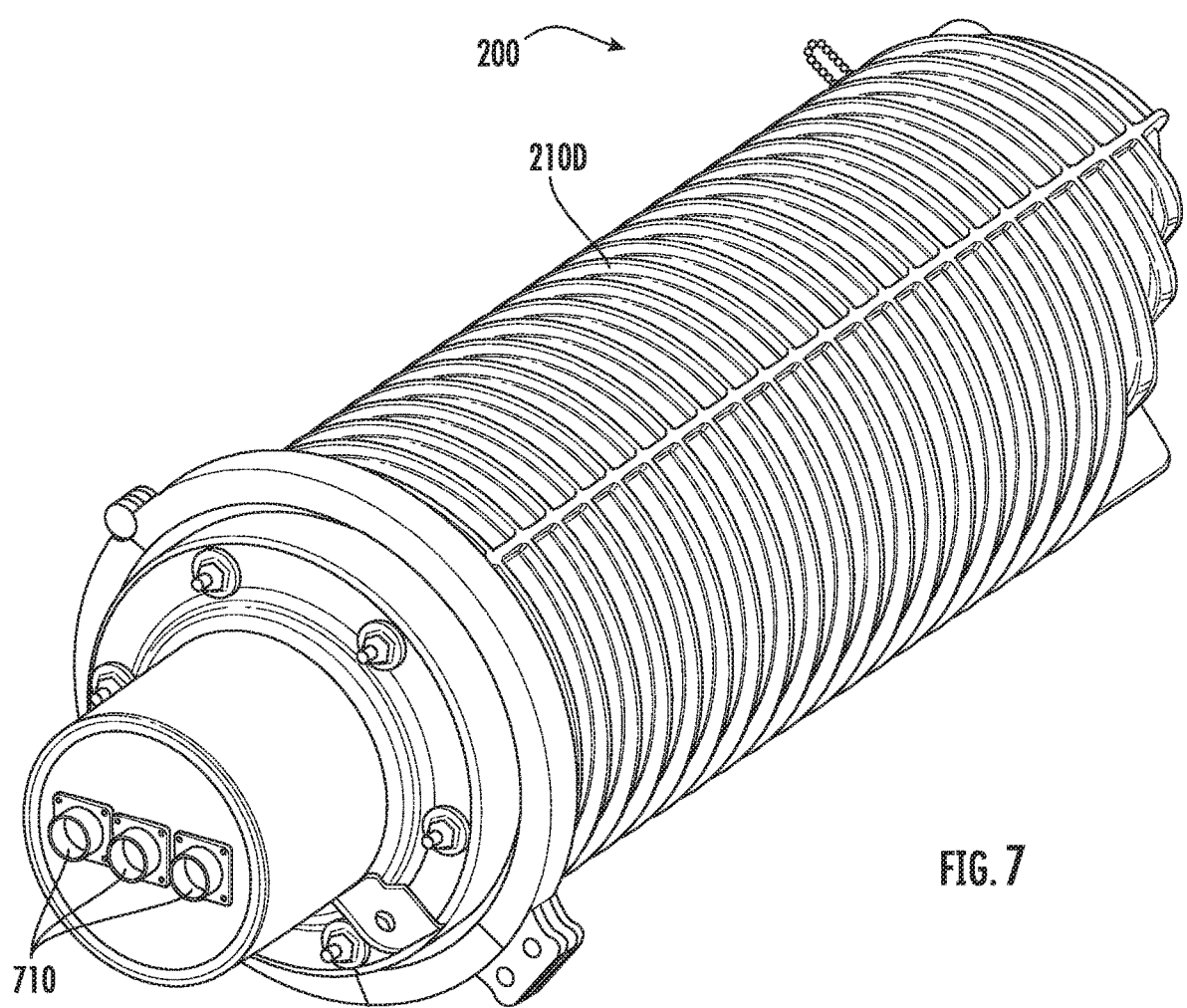
FIG. 7 is a perspective view of an end of an enclosure according to embodiments of the present inventive concepts.

FIG. 7 is a perspective view of an end of an enclosure 200 according to embodiments of the present inventive concepts. The enclosure 200 may be a power and fiber splice enclosure, or may be a fiber-free power cable enclosure. The enclosure 200 is shown in FIG. 7 with a dome 210D present.

The enclosure 200 is also shown with external power connectors 710. For example, one or more of the power connectors 710 may be on an end of the enclosure 200 and may be electrically connected to power circuitry 250 (FIG. 2E), or to another component, that is inside the enclosure 200. By providing the power connectors 710 on an outside (rather than inside) of the enclosure 200, a technician can quickly and safely connect power to/from the enclosure 200 without needing to remove the dome 210D (or another cover) from the enclosure 200. For example, positive/negative 190 Volts DC can be directly attached or pigtailed to the enclosure 200. The power connectors 710 can thus help to achieve the goal of plug-and-play power connectivity for the enclosure 200.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A power and fiber splice enclosure comprising:
   a first tray comprising a power conductor terminal;
   a second tray comprising an optical fiber splice area;
   a third tray comprising an optical fiber storage tray; and
   a protective lid over the power conductor terminal in the first tray.

2. The power and fiber splice enclosure of claim 1, wherein the first tray further comprises a power-in port, a power-out port, and first and second power tap ports, and
   wherein the power conductor terminal comprises a terminal of one of the power-in port, the power-out port, the first power tap port, or the second power tap port.

3. The power and fiber splice enclosure of claim 2, further comprising first, second, third, and fourth circuit breakers that comprise, or are coupled to, the power-in port, the power-out port, the first power tap port, and the second power tap port, respectively.

4. The power and fiber splice enclosure of claim 1, further comprising:
a locking mechanism that is configured to automatically lock the protective lid in response to the power conductor terminal being energized.

5. The power and fiber splice enclosure of claim 1, further comprising a compartment comprising the power conductor terminal in the first tray,
wherein the protective lid comprises a transparent lid on the compartment.

6. The power and fiber splice enclosure of claim 5,
wherein the compartment and the first tray comprise respective fiber-free trays, and
wherein the second and third trays comprise respective power-free trays.

7. The power and fiber splice enclosure of claim 1, wherein the power conductor terminal comprises a terminal of a circuit that is configured to supply power exceeding 150 Watts.

8. The power and fiber splice enclosure of claim 1, further comprising a tray attachment structure, wherein the second and third trays are hingedly coupled to the tray attachment structure.

9. The power and fiber splice enclosure of claim 1, further comprising a power connector on an outside of the power and fiber splice enclosure.

10. The power and fiber splice enclosure of claim 1, wherein a base portion of the power and fiber splice enclosure comprises a metal ground terminal thereon.

11. The power and fiber splice enclosure of claim 1,
wherein the protective lid comprises a first protective lid,
wherein the power conductor terminal comprises a terminal of a first power conductor terminal block in the first tray, and
wherein the power and fiber splice enclosure further comprises:
a second power conductor terminal block in the first tray; and
a second protective lid over the second power conductor terminal block.

12. The power and fiber splice enclosure of claim 1, further comprising a power plug on an external surface of the first tray.

13. The power and fiber splice enclosure of claim 1, further comprising a DIN rail mount circuit breaker in the first tray,
wherein the power conductor terminal in the first tray comprises a terminal of the DIN rail mount circuit breaker.

14. The power and fiber splice enclosure of claim 1, further comprising surge-protection circuitry in the first tray.

15. The power and fiber splice enclosure of claim 1, further comprising:
a fiber optic tube that is in the optical fiber storage tray;
an optical fiber that is connected to the optical fiber splice area in the second tray; and
a power conductor that is configured to supply power exceeding 150 Watts and is connected to the power conductor terminal.

16. The power and fiber splice enclosure of claim 1, further comprising:
a visual power-on warning indicator that is configured to indicate that the power conductor terminal is energized; and/or
a locking mechanism that is configured to automatically lock the protective lid in response to the power conductor terminal being energized.

17. A power and fiber splice enclosure comprising:
a first tray comprising a power-in port, a power-out port, and a power tap port;
a second tray comprising an optical fiber splice area;
a third tray comprising an optical fiber storage tray;
a protective lid on the first tray over the power-in port, the power-out port, and the power tap port; and
a fourth tray comprising the first tray therein.

18. The power and fiber splice enclosure of claim 17,
wherein the first and fourth trays comprise respective fiber-free trays,
wherein the second and third trays comprise respective power-free trays,
wherein the power tap port comprises a first power tap port,
wherein the power and fiber splice enclosure further comprises a second power tap port in the first tray under the protective lid, and
wherein the power-in port, the power-out port, and the first and second power tap ports comprise ports of a circuit that is configured to supply power exceeding 150 Watts.

19. A hybrid enclosure comprising a power conductor terminal and an optical fiber splice area in separate first and second trays, respectively, wherein the power conductor terminal comprises a terminal of a circuit that is configured to supply power exceeding 150 Watts.

20. The hybrid enclosure of claim 19, further comprising at least one power-in/out port and at least one power tap port in the first tray,
wherein the power conductor terminal comprises a terminal of one of the at least one power-in/out port or the at least one power tap port,
wherein the first tray comprises a fiber-free tray, and
wherein the second tray comprises a power-free tray.

* * * * *